(12) United States Patent
Wiesenberg et al.

(10) Patent No.: US 10,984,299 B1
(45) Date of Patent: Apr. 20, 2021

(54) DETECTION SYSTEMS, APPARATUS, AND RELATED METHODS FOR USE WITH VEHICLE SENSOR MODULES

(71) Applicant: TOYOTA MOTOR ENGINEERING & MANUFACTURING NORTH AMERICA, INC., Plano, TX (US)

(72) Inventors: Ryan M. Wiesenberg, Ann Arbor, MI (US); John-Michael McNew, Ann Arbor, MI (US); Ethan Pomish, Livonia, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/686,846

(22) Filed: Nov. 18, 2019

(51) Int. Cl.
| | |
|---|---|
| *G06K 19/06* | (2006.01) |
| *G06T 7/73* | (2017.01) |
| *G06T 7/60* | (2017.01) |
| *G01S 7/497* | (2006.01) |
| *G06T 7/80* | (2017.01) |
| *G01S 17/931* | (2020.01) |

(52) U.S. Cl.
CPC ........ *G06K 19/06037* (2013.01); *G01S 7/497* (2013.01); *G01S 17/931* (2020.01); *G06K 19/06028* (2013.01); *G06T 7/60* (2013.01); *G06T 7/73* (2017.01); *G06T 7/80* (2017.01); *G06T 2207/30252* (2013.01)

(58) Field of Classification Search
CPC ............ G06K 19/060347; G06K 7/14; G06K 7/1417

USPC .......................................................... 235/494
See application file for complete search history.

(56) References Cited

U.S. PATENT DOCUMENTS

| | | | |
|---|---|---|---|
| 8,502,860 B2 | 8/2013 | Demirdjian | |
| 9,804,191 B2 | 10/2017 | Kida et al. | |
| 10,288,720 B1* | 5/2019 | Adolf | G01S 7/4026 |
| 2002/0134835 A1* | 9/2002 | Kennedy | G06K 19/06028 235/384 |
| 2017/0336496 A1 | 11/2017 | Fujii et al. | |
| 2019/0061626 A1* | 2/2019 | Dupuis | G06K 9/00791 |
| 2019/0066484 A1* | 2/2019 | Park | G08B 25/10 |
| 2019/0204427 A1 | 7/2019 | Abari et al. | |
| 2020/0092694 A1* | 3/2020 | Chen | H04W 4/40 |

FOREIGN PATENT DOCUMENTS

DE 10 2008 057 674 A1 7/2009

* cited by examiner

*Primary Examiner* — Ahshik Kim
(74) *Attorney, Agent, or Firm* — Oblon, McClelland, Maier & Neustadt, L.L.P.

(57) ABSTRACT

Detection systems, apparatus, and related methods for use with vehicle sensor modules are disclosed. A disclosed detection system for one or more vehicles includes a vehicle sensor module and a positioning feature disposed on a vehicle exterior or infrastructure. The positioning feature includes a machine-readable code associated with predefined calibration data of the positioning feature. The detection system also includes a vehicle controller configured to detect, via the vehicle sensor module, the positioning feature when the positioning feature is visible to the vehicle sensor module. The vehicle controller is configured to obtain the predefined calibration data in response to reading the machine-readable code and calibrate the vehicle sensor module based on the predefined calibration data.

18 Claims, 9 Drawing Sheets

DETECTION SYSTEMS, APPARATUS, AND RELATED METHODS FOR USE WITH VEHICLE SENSOR MODULES

FIELD OF THE DISCLOSURE

This disclosure relates generally to vehicles and, more particularly, to detection systems, apparatus, and related methods for use with vehicle sensor modules.

BACKGROUND

Sensor systems can be advantageously used in many different applications. For example, motor vehicles typically employ sensor systems to improve vehicle performance, safety, and/or driver comfort. In particular, a vehicle having autonomous functionality (sometimes referred to as an autonomous vehicle) utilizes different sensors that are positioned on the vehicle at locations of interest such as a roof, a fender, a side panel, etc. These sensors are often configured to detect vehicle surroundings such as objects near the vehicle, which enables an electronic control unit (ECU) to substantially drive the vehicle without assistance from a person. Additionally, in certain automotive manufacturing applications, robotic devices (e.g., a robot arm) similarly employ sensor systems to improve operational parameters or characteristics and/or enable autonomous functionality.

SUMMARY

An example detection system for one or more vehicles includes a vehicle sensor module and a positioning feature disposed on a vehicle exterior or infrastructure. The positioning feature includes a machine-readable code associated with predefined calibration data of the positioning feature. The detection system also includes a vehicle controller configured to detect, via the vehicle sensor module, the positioning feature when the positioning feature is visible to the vehicle sensor module. The vehicle controller is configured to obtain the predefined calibration data in response to reading the machine-readable code and calibrate the vehicle sensor module based on the predefined calibration data.

An example vehicle includes a sensor module and a controller configured to detect, via the sensor module, a positioning feature disposed on the vehicle, a different vehicle, or infrastructure when the positioning feature is visible to the sensor module. The positioning feature includes a machine-readable code associated with predefined calibration data of the positioning feature. The controller is configured to obtain the predefined calibration data in response to reading the machine-readable code and calibrate the sensor module based on the predefined calibration data.

An example tangible machine-readable storage medium includes instructions that, when executed, cause a processor to at least detect, via a sensor module, a positioning feature disposed on a vehicle exterior or infrastructure. The positioning feature includes a machine-readable code associated with predefined calibration data of the positioning feature. The instructions also cause the processor to obtain the predefined calibration data in response to reading the machine-readable code. The instructions also cause the processor to calibrate the sensor module based on the predefined calibration data.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figure 1:
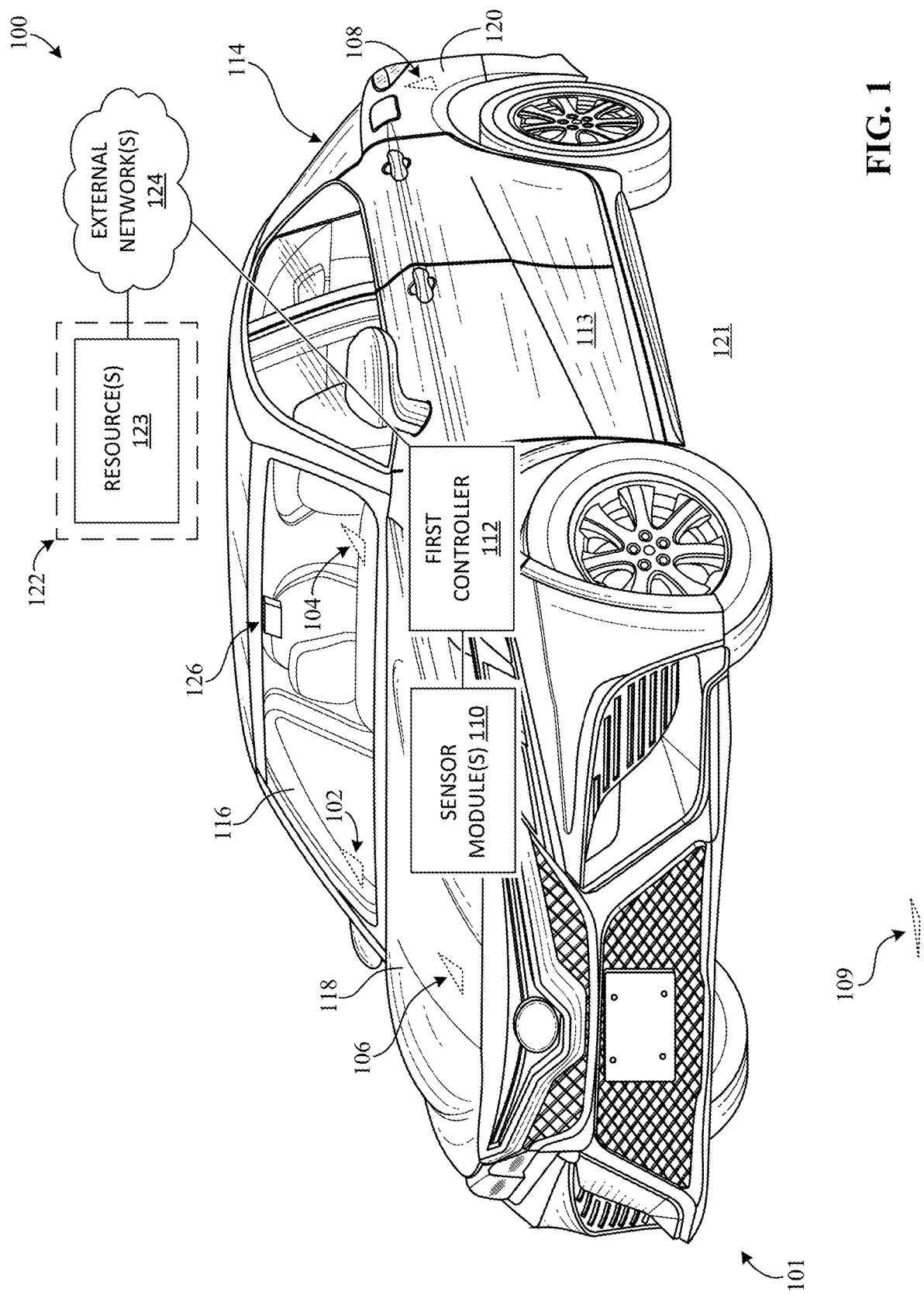
FIG. 1 is a view of an example detection system for one or more example vehicles in accordance with the teachings of this disclosure.

Some known vehicles include sensors, such as proximity sensors, image sensors, cameras, etc., that are typically attached to a vehicle via a coupling mechanism that hold the sensors in place relative to the vehicle. When installed on the vehicle, such sensors are typically calibrated according to one or more known manual calibration methods or techniques. However, such known manual methods or techniques of sensor calibration are time consuming and/or prone to user error, which may not be desirable to person(s) installing, upgrading, and/or replacing vehicle sensor packages.

Detection systems, apparatus, and related methods for use with vehicle sensor modules are disclosed. Examples disclosed herein provide an example detection system that includes an example vehicle sensor module (e.g., one of a proximity sensor, an image sensor, a camera, etc.) and an example vehicle controller (e.g., an ECU) (sometimes referred to as a primary or first vehicle controller) communicatively coupled to the vehicle sensor module. The disclosed vehicle controller and vehicle sensor module are operatively coupled to and/or otherwise implemented in a first example vehicle. In particular, to aid the vehicle controller in detecting surroundings and/or an external environment of the first vehicle, the disclosed detection system also includes at least one example positioning feature (e.g., a tag, a sticker, particular paint, etc.) disposed on (a) an exterior of the first vehicle, (b) an exterior of a second example vehicle different from the first vehicle, or (c) infrastructure (e.g., transportation infrastructure, building infrastructure, etc.) the first vehicle may encounter while driving. When the positioning feature is within a field of view (FOV) of the vehicle sensor module and/or otherwise visible thereto, the vehicle controller is configured to detect, via the vehicle sensor module, the positioning feature as well as a structure of interest (e.g., the first vehicle, the second vehicle, or the infrastructure) on which the positioning feature is placed.

Disclosed examples also provide example predefined calibration data of the positioning feature (e.g., preprogrammed into the vehicle controller), which enables the vehicle controller to calibrate the vehicle sensor module and/or enable self-calibration thereof in response to detecting the positioning feature. In particular, the disclosed predefined calibration data indicates to the controller one or more predefined parameters of the detected positioning feature such as, for example, one or more (e.g., all) of (a) a predefined size of the positioning feature, (b) a predefined shape of the positioning feature, (c) a predefined location of the positioning feature relative to the structure of interest and/or (e) a predefined orientation of the positioning feature relative to the structure of interest. Such predefined parameter(s) of the positioning features may be predetermined or predefined (e.g., by a person) when the positioning feature is produced and, in some examples, is preprogrammed into the controller as the predefined calibration data. To calibrate the vehicle sensor module, the disclosed controller first detects, via the sensor module, one or more observed parameters of the positioning feature, which may be substantially different relative to the predefined parameter(s) (e.g., if the sensor module is not sufficiently calibrated). In such examples, the controller then compares the observed parameter(s) to the predefined parameter(s), which enables the controller to calculate and/or determine one or more adjustments for the sensor module associated with calibrating the sensor module. The controller then adjusts one or more operating parameters of the sensor module based on the determined adjustment(s), thereby calibrating the sensor module. In this manner, disclosed examples facilitate calibration (e.g., self-calibration) of the sensor module and/or one or more other sensor modules without assistance from a person, which reduces time and/or prevents user error(s) typically associated with installing, upgrading, and/or replacing such vehicle electronic components.

In some examples where at least some or all of the predefined calibration data is not preprogrammed into the controller, the disclosed positioning feature is provided with an example machine-readable code (e.g., a barcode) that is associated with the predefined calibration data. As will be discussed in greater detail below in connection with FIGS. 1-5, 6A, 6B, and 8, the disclosed machine-readable code enables the vehicle controller (and/or a different vehicle controller) to quickly acquire the predefined calibration data. In particular, in such examples, at least some or all of the predefined calibration data is visually encoded in the machine-readable code. Accordingly, the disclosed controller is configured to read and/or decode, via the sensor module, the machine-readable code to obtain at least some or all of the predefined calibration data from the machine-readable code. Additionally or alternatively, depending on data or storage capacity of the machine-readable code and/or an amount of the predefined calibration data, the disclosed machine-readable code is configured to direct, upon detection, the controller to at least one resource (e.g., a web page, a database, etc.) external to the first vehicle and storing some or all of the predefined calibration data. In such examples, the resource is accessible to the controller, for example, via one or more external networks operatively interposed between the controller and an external processing platform (e.g., a server such as a web server) associated with the resource. In such examples, to enable the controller to locate the resource and retrieve the predefined calibration data, an example resource identifier (e.g., a universal resource locator (URL)) is visually encoded in the machine-readable code and references the resource. Accordingly, in such examples, the disclosed controller reads and/or decodes, via the sensor module, the machine-readable code to obtain the resource identifier from the machine-readable code. Then, the controller is configured to access, using the resource identifier, the resource to obtain at least some or all of the predefined calibration data from the resource. Thus, in response to reading and/or decoding the machine-readable code, the disclosed controller obtains the predefined calibration data from the machine-readable code, the resource, or a combination thereof.

As previously mentioned, in some examples, the positioning feature is disposed on the second vehicle. In such examples, example data of interest (e.g., sharable data) is visually encoded in the machine-readable code and/or stored in the resource. The disclosed data of interest includes the predefined calibration data of the positioning feature and/or, in some examples, other vehicle data of the second vehicle. For example, the disclosed other vehicle data indicates to the controller one or more (e.g., all) of (a) a registration number (sometimes referred to as a plate number or a license plate number) of the second vehicle, (b) a vehicle identification number (VIN) of the second vehicle, and/or (c) a communication address of the second vehicle. Such vehicle data enables the disclosed controller to identify and/or confirm an identification of the second vehicle, for example, during communications and/or interactions between with the first and second vehicles. In this manner, disclosed examples enable, intelligently, vehicle-to-vehicle (V2V) communications associated with the first vehicle, the second vehicle, and/or one or more other vehicles used with the disclosed detection system. Additionally, in such examples, the disclosed detection system also includes an auxiliary or second vehicle controller (e.g., an ECU) operatively coupled to the second vehicle and configured to communicate with the processing platform via the external network(s) to send data to the processing platform. In particular, to better enable the primary vehicle controller to calibrate the vehicle sensor module, the second vehicle controller is configured to update (e.g., repeatedly or continuously) the resource such that the predefined calibration data includes data associated with operation of the second vehicle such as, for example, a location of the second vehicle, a speed of the second vehicle, an orientation of the second vehicle, etc.

For aesthetic purposes and/or preventing a driver or person from encountering visual distractions while driving, the disclosed positioning feature is invisible to the person and/or otherwise difficult to see by the person. For example, the positioning feature may be embedded into paint of a vehicle body. In another example, the positioning feature is painted on the vehicle body using infrared paint. In such examples, the positioning feature is painted on the vehicle body in such a manner that the positioning feature is reflective to light detection and ranging (LiDAR) sensor components to enable calibration of the LiDAR sensor components. Additionally or alternatively, the positioning feature is configured to emit or reflect light only in an infrared spectrum (e.g., light having a wavelength between about 700 nanometers (nm) and about 1 millimeter (mm)) such that the positioning feature is only detectable by infrared imaging devices.

Additionally, in some examples, the disclosed detection system can be expanded. In such examples, the positioning feature is a first positioning feature, and the detection system includes one or more other positioning features (e.g., tags, stickers, particular paints, etc.) having aspects similar or identical to the aspects disclosed in connection with the first positioning feature. In such examples, such multiple positioning features of the detection system are disposed on the first vehicle, the second vehicle, one or more different vehicles, the infrastructure, etc., or a combination thereof.

FIG. 1 is a view of an example detection system 100 for one or more example vehicles 101 in accordance with the teachings of this disclosure, one of which is shown in this example (i.e., a first example vehicle 101). The first vehicle 101 of FIG. 1 is, for example, a car, a truck, a van, a sport utility vehicle (SUV), etc. in which examples disclosed herein can be implemented. According to the illustrated example of FIG. 1, the detection system 100 includes one or more detectable positioning features 102, 104, 106, 108, 109, one or more example sensor modules 110 of the first vehicle 101, and a primary or first example controller 112. In particular, the first controller 112 of FIG. 1 is operatively coupled to the first vehicle 101 and configured to detect, via the sensor module(s) 110, one or more (e.g., all) of the positioning feature(s) 102, 104, 106, 108, 109 of the detection system 100 when the positioning feature(s) 102, 104, 106, 108, 109 are visible to the sensor module(s) 110. Such detection occurs during, for example, a manufacturing or calibration process associated with the first vehicle 101, operation of the first vehicle 101, vehicle servicing, etc.

The positioning feature(s) 102, 104, 106, 108, 109 can be implemented, for example, using (a) one or more tags, (b) one or more stickers, (c) paint (e.g., infrared paint), (d) etc. (e) any other detectable structure(s), or (f) a combination thereof. Five of the positioning feature(s) 102, 104, 106, 108, 109 are shown in the illustrated example of FIG. 1. In other words, the detection system 100 of FIG. 1 includes a first positioning feature (e.g., one of a tag, a sticker, paint, etc.) 102, a second positioning feature (e.g., one of a tag, a sticker, paint, etc.) 104, a third positioning feature (e.g., one of a tag, a sticker, paint, etc.) 106, a fourth positioning feature (e.g., one of a tag, a sticker, paint, etc.) 108, and a fifth positioning feature (e.g., one of a tag, a sticker, paint, etc.) 109, which are represented by the dotted/dashed lines of FIG. 1. In particular, each of the positioning feature(s) 102, 104, 106, 108, 109 is disposable on a surface of interest such as, for example, a surface (e.g., an outer surface) 113 of the first vehicle 101, a surface of a different vehicle, and/or a surface of example infrastructure (e.g., transportation infrastructure, building infrastructure, etc.) that the first vehicle 101 may encounter. Further, in some examples where one or more of the positioning features 102, 104, 106, 108, 109 of FIG. 1 are implemented using the tag(s) and/or the sticker(s), each of the positioning feature(s) 102, 104, 106, 108, 109 is configured to couple to the surface of interest at a substantially fixed or known location relative to the surface of interest, for example, via one or more example fasteners (e.g., an adhesive) and/or one or more example fastening methods or techniques. Further, in some examples where one or more of the positioning features 102, 104, 106, 108, 109 of FIG. 1 are implemented using paint (e.g., infrared paint), the positioning feature(s) 104, 106, 108, 109 are formed on the surface of interest at a substantially fixed or known location relative to the surface of interest, for example, via one or more paint application methods or techniques.

As shown in FIG. 1, each of the first, second, third, and fourth positioning features 102, 104, 106, 108 is disposed on and/or coupled to an exterior 114 of the first vehicle 101, for example, at different locations of interest on the first vehicle 101. According to the illustrated example of FIG. 1, the first and second positioning features 102, 104 are disposed on a first example window (e.g., a windshield) 116 of the first vehicle 101. Further, the third positioning feature 106 of FIG. 1 is disposed on a first body panel (e.g., a hood) 118 of the first vehicle 101. Further still, the fourth positioning feature 108 of FIG. 1 is disposed on a second body panel (e.g., a quarter panel) 120 of the first vehicle 101. Each of the first window 116, the first body panel 118, the second body panel 120, and/or, more generally, the exterior 114 of the first vehicle 101 is sometimes referred to as a vehicle exterior. However, in some examples, one or more of these positioning features 102, 104, 106, 108 are disposed on the first vehicle 101 differently. For example, one of the positioning features 102, 104, 106, 108 can be disposed on a vehicle fender, a vehicle wheel arch panel, a vehicle valance panel, a vehicle rocker panel, a vehicle gate (e.g., a tailgate, a lift gate, a swing gate, etc.), a vehicle door, a different vehicle window, etc. and/or any other suitable vehicle exterior.

Although FIG. 1 depicts the four positioning features 102, 104, 106, 108 on the first vehicle 101, in some examples, one or more (e.g., all) of the positioning feature(s) 102, 104, 106, 108, 109 of the detection system 100 are disposed on one or more different vehicles, as discussed further below in connection with FIG. 2. Further, in some examples, one or more of the positioning feature(s) 102, 104, 106, 108, 109 of the detection system 100 are disposed on the infrastructure that is external to the first vehicle 101. For example, the fifth positioning feature 109 of FIG. 1 is disposed on and/or coupled to an example driving surface (e.g., concrete, asphalt, etc.) 121 near or adjacent the first vehicle 101. In addition or alternatively to such a road structure, one or more of the positioning features 102, 104, 106, 109 of the detection system 100 can be similarly disposed on and/or coupled to a sign (e.g., a traffic sign or road sign such as a stop sign). In any case, such infrastructure is external to the first vehicle 101.

To facilitate identification of a positioning feature, each of the positioning feature(s) 102, 104, 106, 108, 109 of the detection system 100 is particularly sized and/or shaped, for example, to form a particular polygon (e.g., a regular polygon or an irregular polygon), a particular curved shape (e.g., a circle, an oval, an ellipse, etc.), etc. For example, all of the first, second, third, fourth, and fifth positioning features 102, 104, 106, 108, 109 are triangular and/or form triangles. However, in some examples, one or more of the positioning feature(s) 102, 104, 106, 108, 109 are implemented differently, as discussed further below in connection with FIG. 4. In some examples, one or more (e.g., all) of the positioning feature(s) 102, 104, 106, 108, 109 of the detection system are concave-shaped.

When the positioning feature(s) 102, 104, 106, 108, 109 of FIG. 1 are produced, each of the positioning feature(s) 102, 104, 106, 108, 109 has a substantially fixed shape and/or size. Additionally or alternatively, when implemented in the first vehicle 101, each of the positioning feature(s) 102, 104, 106, 108, 109 has a substantially fixed position relative to the first vehicle 101 and/or a substantially fixed orientation relative to the first vehicle 101. In particular, such parameter(s) of the positioning feature(s) 102, 104, 106, 108, 109 are predetermined and/or predefined (e.g., by a user), and related calibration data (sometimes referred to as a predefined calibration data) indicative the parameter(s) of the positioning feature(s) 102, 104, 106, 108, 109 is generated for use with the controller(s) 112 of the detection system 100.

Additionally, in some examples, for aesthetic purposes and/or preventing a person from encountering visual distractions while driving, the positioning feature(s) 102, 104, 106, 108, 109 of the detection system 100 are implemented such that one or more (e.g., all) of the positioning feature(s) 102, 104, 106, 108, 109 are invisible to the person and/or otherwise difficult to see by the person. In such examples, the positioning feature(s) 102, 104, 106, 108, 109 of the detection system 100 are embedded into paint of a vehicle body (e.g., paint of the first body panel 118 and/or paint of the second body panel 120). Additionally or alternatively, in such examples, the positioning feature(s) 102, 104, 106, 108, 109 are configured to emit or reflect light only in an infrared spectrum such that the positioning feature(s) 102, 104, 106, 108, 109 are only detectable by infrared imaging device(s). For example, the positioning feature(s) 102, 104, 106, 108, 109 are configured to emit or reflect light having a wavelength between about 700 nm and about 1 mm. Further still, in some examples, the positioning feature(s) 102, 104, 106, 108, 109 are painted on a vehicle body in such a manner that the positioning feature(s) 102, 104, 106, 108, 109 are reflective to LiDAR sensor(s). As such, in examples where the sensor module(s) 110 include at least one LiDAR sensor, the first controller 112 is configured to detect the positioning feature(s) 102, 104, 106, 108, 109 in accordance with one or more methods associated with LiDAR.

In some examples, to facilitate quick and/or convenient accessibility, at least some or all of the calibration data is preprogrammed into the first controller 112. Additionally or alternatively, in some examples, at least some or all of the calibration data is particularly stored in one or more of the positioning feature(s) 102, 104, 106, 108, 109, for example, by using one or more example machine-readable codes (e.g., barcodes), as discussed further below in connection with FIG. 4. For example, the first positioning feature 102 of FIG. 1 includes a first machine-readable code (e.g., a barcode) that is associated with calibration data of or specific to the first positioning feature 102, and the calibration data of the first positioning feature 102 is visually encoded in the first machine-readable code, for example, via one or more visual encoding methods or techniques. Further, in another example, the second positioning feature 104 of FIG. 1 includes a second machine-readable code (e.g., a barcode) that is associated with calibration data of or specific to the second positioning feature 104, and the calibration data of the second positioning feature 104 is visually encoded in the second machine-readable code. Further, in yet another example, the third positioning feature 106 of FIG. 1 includes a third machine-readable code (e.g., a barcode) that is associated with calibration data of or specific to the third positioning feature 106, and the calibration data of the third positioning feature 106 is visually encoded in the third machine-readable code. Further, in yet another example, the fourth positioning feature 108 of FIG. 1 includes a fourth machine-readable code (e.g., a barcode) that is associated with calibration data of the fourth positioning feature 108, and the calibration data of the fourth positioning feature 108 is visually encoded in the fourth machine-readable code. Further, in yet another example, the fifth positioning feature 109 of FIG. 1 includes a fifth machine-readable code (e.g., a barcode) that is associated with calibration data of or specific to the fifth positioning feature 109, and the calibration data of the fifth positioning feature 109 is visually encoded in the fifth machine-readable code. In such examples, the first controller 112 is configured to read and/or decode, via the sensor module(s) 110, one or more (e.g., all) of the machine-readable code(s) in response to detecting respective one(s) of the positioning feature(s) 102, 104, 106, 108, 109, thereby obtaining at least some or all of the calibration data from the machine-readable code(s).

Additionally or alternatively, in some examples, the detection system 100 of FIG. 1 also includes an example processing platform 122 (sometimes referred to as an external processing platform) and one or more example resources (e.g., web resources) 123 (sometimes referred to as external resources) external to the first vehicle 101 and accessible to the first controller 112. In such examples, the resource(s) 123 store at least some or all of the calibration data and are maintained by the processing platform 122. The resource(s) 123 of FIG. 1 include, for example, one or more web pages, one or more databases, etc., and/or any other suitable resource(s) that are external to the first vehicle 101 and usable by the first controller 112. The processing platform 122 of FIG. 1 can be implemented, for example, using one or more of a server (e.g., a web server), a personal computer, a vehicle ECU, or any other type of computing device.

In such examples, to facilitate accessing the resource(s) 123 and/or the calibration data associated therewith, the first controller 112 of FIG. 1 is communicatively coupled to one or more example external networks 124 operatively interposed between the processing platform 122 and the first controller 112. The external network(s) 124 of FIG. 1 can be implemented, for example, using one or more cellular networks, one or more satellite networks, one or more wireless local area networks (LANs), the Internet, etc. and/or any other suitable network(s) that are external to the first vehicle 101 and can form part of a vehicle communication system. That is, in some examples, the external network(s) 124 of FIG. 1 form at least part of a communication system associated with the first vehicle 101 such as, for example, one of a vehicle-to-infrastructure (V2I) communication system, a V2V communication system, a vehicle-to-everything (V2X) communication system, etc. In particular, the detection system 100 also includes one or more example resource identifiers (e.g., URLs) that are visually encoded in the machine-readable code(s) of the positioning feature(s) 102, 104, 106, 108, 109 and reference respective one(s) of the external resource(s) 123, which enable the first controller 112 to locate and access the external resource(s) 123 through the external network(s) 124. Accordingly, the first controller 112 of FIG. 1 is configured to read and/or decode, via the sensor module(s) 110, the machine-readable code(s) to obtain the resource identifier(s) from the machine-readable code(s). Then, based on the resource identifier(s), the first controller 112 communicates with the external processing platform 122 via the external network(s) 124. More particularly, in such examples, the first controller 112 is configured to access, using the resource identifier(s), the resource(s) 123 to obtain at least some or all of the calibration data from the resource(s) 123.

The sensor module(s) 110 of FIG. 1 can be implemented, for example, using (a) one or more image sensors, (b) one or more imagine devices (e.g., cameras), (c) one or more proximity sensors (e.g., radar sensors, sonar sensors, LiDAR sensors etc.), (d) etc., (e) any other suitable vehicle sensor module(s) or sensing device(s), or (f) a combination thereof. The sensor module(s) 110 of FIG. 1 are positioned on and/or operatively coupled to the first vehicle 101, for example, via one or more fasteners and/or one or more fastening methods or techniques. For example, a first example sensor module (e.g., an image sensor or a camera) 126 (i.e., one of the sensor module(s) 110 of the detection system 100) is positioned adjacent the window 116 at a topmost (in the orientation of FIG. 1) portion of the window 116. In particular, the sensor module(s) 110, 126 of the detection system 100 are configured to generate sensor data (e.g., raw data) indicative of the positioning feature(s) 102, 104, 106, 108, 109 and provide the sensor data to the first controller 112 for processing, which enables the first controller 112 to detect the positioning feature(s) 102, 104, 106, 108, 109 and/or read the machine-readable code(s). For example, depending on an FOV associated with the first sensor module 126, the first sensor module 126 generates sensor data indicative of the first positioning feature 102, the second positioning feature 104, the third positioning feature 106, and/or the fifth positioning feature 109. Accordingly, the sensor module(s) 110, 126 of the detection system 100 are communicatively coupled to the first controller 112 to provide the data thereto and/or receive data therefrom, for example, via a transmission or signal wire, a bus (e.g., a vehicle controller area network (CAN) bus), radio frequency, etc.

The first controller 112 of FIG. 1 can be implemented, for example, using one or more ECUs of the first vehicle 101 and/or any other suitable computing device(s). In such examples, the first controller 112 is implemented by the first vehicle 101. In particular, the first controller 112 is communicatively coupled to the sensor module(s) 110 and the external network(s) 124, for example, via a transmission or signal wire, a bus, radio frequency, etc. Additionally or alternatively, in some examples where the sensor module(s) 110, 126 have self-calibrating functionality, the first controller 112 of FIG. 1 is implemented by at least one of the sensor module(s) 110, 126. In such examples, the first controller 112 and the at least one of the sensor module(s) 110, 126 form a single or integral device of interest such as, for example, a camera. In any case, the first controller 112 of FIG. 1 is sometimes referred to as a vehicle controller. The first controller 112 of FIG. 1 is carried and/or supported by the first vehicle 101.

According to the illustrated example of FIG. 1, the first controller 112 is configured to determine, via the sensor module(s) 110, 126, one or more observed parameters of the positioning feature(s) 102, 104, 106, 108, 109, which facilitates calculating and/or determining one or more adjustments for the sensor module(s) 110, 126 associated with calibrating the sensor module(s) 110, 126. In some examples, for each of the positioning feature(s) 102, 104, 106, 108, 109 of the detection system 100, the first controller 112 can determine one or more (e.g., all) of (a) an observed size, (b) an observed shape, (c) an observed location, and/or (d) an observed orientation. For example, first sensor module 126 generates sensor data indicative of the first positioning feature 102, and the first controller 112 is configured to determine, based on the sensor data, one or more (e.g., all) of (a) a first observed size (e.g., a surface area) of the first positioning feature 102, (b) a first observed shape (e.g., a triangle) of the first positioning feature 102, (c) a first observed location of the first positioning feature 102 relative to a structure of interest (e.g., one of the first vehicle 101, a different vehicle, the driving surface 121, etc.) on which the first positioning feature 102 is disposed, (e) a first observed orientation of the first positioning feature 102 relative to the structure of interest, and/or (f) any other suitable observed parameter(s) of the first positioning feature 102. Continuing with this example, the first controller 112 then compares such observed parameter(s) to one or more respective predefined parameters of the positioning feature(s) 102, 104, 106, 108, 109 provided by the calibration data, thereby calculating and/or determining one or more adjustments for the first sensor module 126 associated with calibrating the first sensor module 126. In such examples, each of the observed and predefined parameters includes a size of the first positioning feature 102, a shape of the first positioning feature 102, a location of the first positioning feature 102, or an orientation of the first positioning feature 102.

Although FIG. 1 depicts the single controller 112, in some examples, the detection system 100 of FIG. 1 is implemented differently, for example, by using one or more other controllers in addition or alternatively to the first controller 112 of FIG. 1. Accordingly, although FIG. 1 depicts aspects in connection with the first controller 112, in some examples, such aspects likewise apply to the other controller(s) of the detection system 100 such as, for example, the second controller 204 of FIG. 2.

Figure 2:
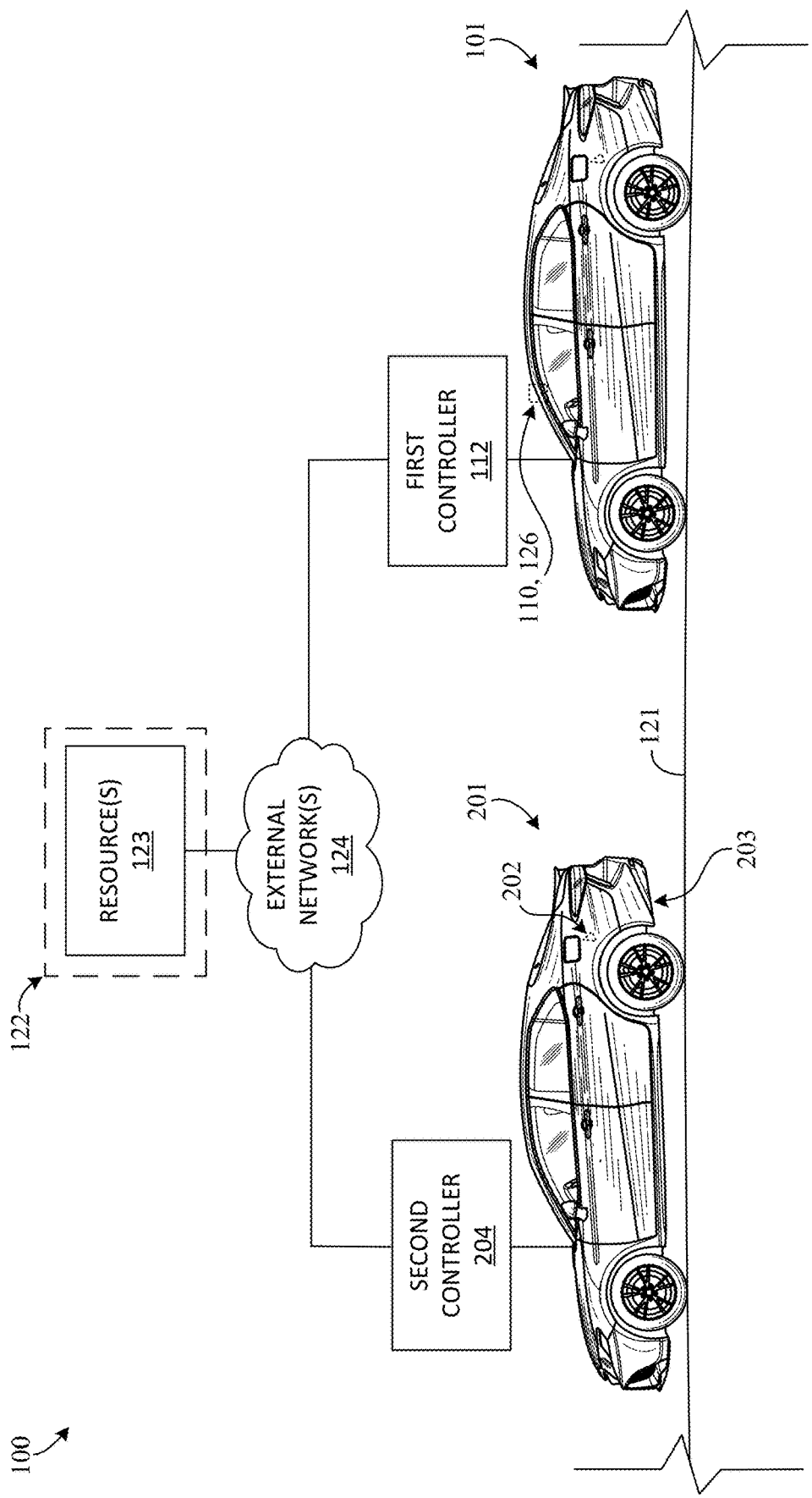
FIG. 2 is a view of two example vehicles in which examples disclosed herein can be implemented.

FIG. 2 is a view of two example vehicles 101, 201 in which examples disclosed herein can be implemented. That is, the detection system 100 of FIG. 2 is configured for use with multiple vehicles such as, for example, the first vehicle 101 of FIG. 1 and a second example vehicle (e.g., a car, a truck, an SUV, etc.) 201 different from the first vehicle 101. According to the illustrated example of FIG. 2, in addition or alternatively to the positioning feature(s) 102, 104, 106, 108, 109 of FIG. 1, the detection system 100 includes one or more other detectable positioning features (e.g., tags, stickers, paint, etc.) 202 disposed on and/or coupled to an exterior 203 (sometimes referred to as a vehicle exterior) of the second vehicle 201, one of which is shown in this example, (i.e., a sixth positioning feature 202). The positioning feature(s) 202 of the detection system 100 of FIG. 2 are similar or identical to the positioning feature(s) 102, 104, 106, 108, 109 of FIG. 1. For example, the first controller 112 can detect, via the sensor module(s) 110, 126, the sixth positioning feature 202 when the sixth positioning feature 202 is visible to the sensor module(s) 110, 126.

According to the illustrated example of FIG. 2, the sixth positioning feature 202 includes a sixth example machine-readable code (e.g., a barcode) to aid the first controller 112 in quickly acquiring example data of interest (e.g., sharable data such as predefined calibration data). For example, the first controller 112 of FIG. 2 is configured to obtain at least some or all of the data of interest in response to the first controller 112 reading and/or decoding the sixth machine-readable code of the sixth positioning feature 202. In such examples, the data of interest includes predefined calibration data (e.g., one or more predefined parameters of the sixth positioning feature 202) of or specific to the sixth positioning feature 202 that is associated with the sixth machine-readable code, which enables the first controller 112 to calibrate the sensor module(s) 110, 126. Additionally or alternatively, the data of interest includes other data of the second vehicle 201, which enables the first controller 112 to identify and/or verify an identification of the second vehicle 201 (e.g., during communications and/or interactions between the first and second vehicles 101, 201). For example, the other data includes one or more (e.g., all) of (a) a registration number of the second vehicle 201, (b) a VIN of the second vehicle 201, (c) a communication address of the second vehicle 201, (d) etc. or (e) a combination thereof.

In some examples, at least some or all of the data of interest is visually encoded in the sixth machine-readable code. In such examples, the first controller 112 is configured to read and/or decode, via the sensor module(s) 110, 126, the sixth machine-readable code to obtain at least some or of the data of interest from the sixth machine-readable code. Additionally or alternatively, in some examples, at least some or all of the data of interest is stored in a particular one of the resource(s) 123. In such examples, to enable the first controller 112 to locate and/or access the particular one of the resource(s) 123, the detection system 100 includes a resource identifier visually encoded in the sixth machine-readable code of the sixth positioning feature 202 and referencing the particular one of the resource(s) 123.

Additionally, in some examples, the detection system 100 of FIG. 2 also includes an auxiliary or second example controller (e.g., an ECU) 204 that is implemented in the second vehicle 201, which may be similar to the first controller 112. The second controller 204 of FIG. 2 is operatively coupled to the second vehicle 201 and communicatively coupled to the external network(s) 124. In particular, the second controller 204 is configured to communicate with the processing platform 122 via the external network(s) 124, for example, to update the resource(s) 123 such that the predefined calibration data includes data associated with operation of the second vehicle 201. The data associated with operation of the second vehicle 201 includes, for example, a location (e.g., provided by positional data associated with a GPS of the second vehicle 201) of the second vehicle 201, an orientation of the second vehicle 201, a speed of the second vehicle 201, etc., which better enables the first controller 112 to calibrate the sensor module(s) 110, 126 when the first controller 112 obtains the predefined calibration data. For example, the second controller 204 is configured to update (e.g., repeatedly and/or continuously) the resource(s) 123 such that the predefined calibration data includes the location of the second vehicle 201.

Figure 3:
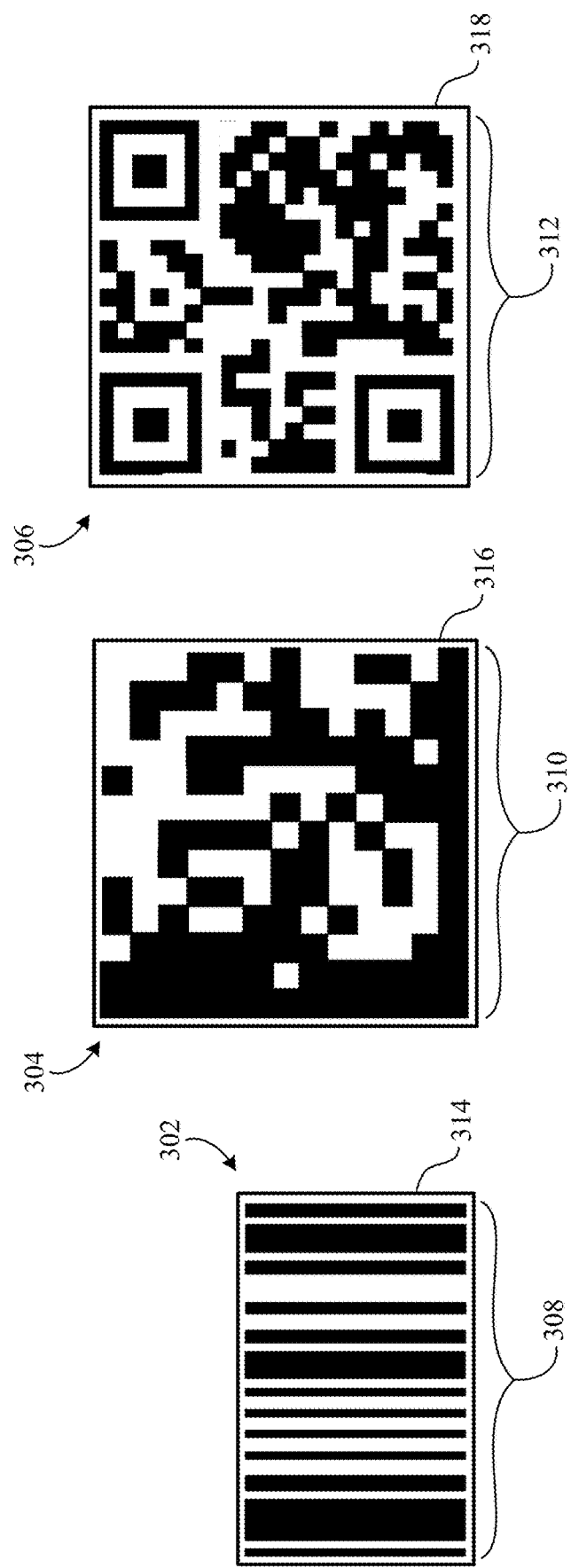
FIGS. 3 and 4 are schematic illustrations of example positioning features in accordance with the teachings of this disclosure.

FIG. 3 is a schematic illustration of example positioning features in accordance with the teachings of this disclosure, three of which are shown in this example (i.e., a seventh positioning feature 302, an eighth positioning feature 304, and a ninth positioning feature 306). In some examples, the positioning features 302, 304, 306 of FIG. 3 correspond to and/or are used to implement at least some of the positioning feature(s) 102, 104, 106, 108, 109, 202 of FIGS. 1 and 2. In such examples, the detection system 100 of FIGS. 1 and 2 includes the positioning features 302, 304, 306 of FIG. 3.

According to the illustrated example of FIG. 3, to facilitate providing data of interest to the controller(s) 112, 204, each of the positioning features 302, 304, 306 forms, defines, and/or otherwise includes one or more machine-readable codes 308, 310, 312 of the detection system 100, three of which are shown in this example, (i.e., a seventh machine-readable code 308, an eighth machine-readable code 310, and a ninth machine-readable code 312). The machine-readable code(s) 308, 310, 312 of FIG. 3 can be implemented, for example, using one or more barcodes and/or any other visual code having data visually encoded thereon. As used herein, the term "barcode" refers to one of a one-dimensional (1D) barcode (e.g., a Universal Product Code (UPC), a Code 39 barcode, etc.) or a two-dimensional (2D) barcode code (e.g., a data matrix, a Quick Response (QR) code, etc.).

The seventh positioning feature 302 of FIG. 3 forms, defines, and/or otherwise includes the seventh machine-readable code 308. As shown in FIG. 3, the seventh machine-readable code 308 is a 1D barcode that is visually identifiable by the controller(s) 112, 204. The seventh positioning feature 302 of FIG. 3 has a contour 314 surrounding an area of the seventh positioning feature 302 on which the seventh machine-readable code 308 is disposed. In particular, the seventh machine-readable code 308 is particularly positioned and/or oriented relative to the seventh positioning feature 302 such that, when the controller(s) 112, 204 detect the seventh positioning feature 302 and the seventh machine-readable code 308, the controller(s) 112, 204 associate the seventh positioning feature 302 with the seventh machine-readable code 308. As shown in FIG. 3, the contour 314 of the seventh positioning feature 302 is substantially rectangular and separate from the seventh machine-readable code 308. However, in some examples, the contour 314 of the seventh positioning feature 302 is sized and/or shaped differently (e.g., see FIG. 4) or is at least partially defined by the seventh machine-readable code 308.

The eighth positioning feature 304 of FIG. 3 forms, defines, and/or otherwise includes the eighth machine-readable code 310. As shown in FIG. 3, the eighth machine-readable code 310 is a 2D barcode that is visually identifiable by the controller(s) 112, 204. The eighth positioning feature 304 of FIG. 3 has a contour 316 surrounding an area of the eighth positioning feature 304 on which the eighth machine-readable code 310 is disposed. In particular, the eighth machine-readable code 310 is particularly positioned and/or oriented relative to the eighth positioning feature 304 such that, when the controller(s) 112, 204 detect the eighth positioning feature 304 and the eighth machine-readable code 310, the controller(s) 112, 204 associate the eighth positioning feature 304 with the eighth machine-readable code 310. As shown in FIG. 3, the contour 316 of the eighth positioning feature 304 is substantially square and separate from the eighth machine-readable code 310. However, in some examples, the contour 316 of the eighth positioning feature 304 is sized and/or shaped differently (e.g., see FIG. 4) or is at least partially defined by the eighth machine-readable code 310.

The ninth positioning feature 306 of FIG. 3 forms, defines, and/or otherwise includes the ninth machine-readable code 312. As shown in FIG. 3, the ninth machine-readable code 312 is a 2D barcode code that is visually identifiable by the controller(s) 112, 204. The ninth positioning feature 306 of FIG. 3 has a contour 318 surrounding an area of the ninth positioning feature 306 on which the ninth machine-readable code 312 is disposed. In particular, the ninth machine-readable code 312 is particularly positioned and/or oriented relative to the ninth positioning feature 306 such that, when the controller(s) 112, 204 detect the ninth positioning feature 306 and the ninth machine-readable code 312, the controller(s) 112, 204 associate the ninth positioning feature 306 with the ninth machine-readable code 312. Further, the contour 318 of the ninth positioning feature 306 is substantially square and separate from the ninth machine-readable code 312. However, in some examples, the contour 318 of the ninth positioning feature 306 is sized and/or shaped differently (e.g., see FIG. 4) or is at least partially defined by the ninth machine-readable code 312.

Figure 4:
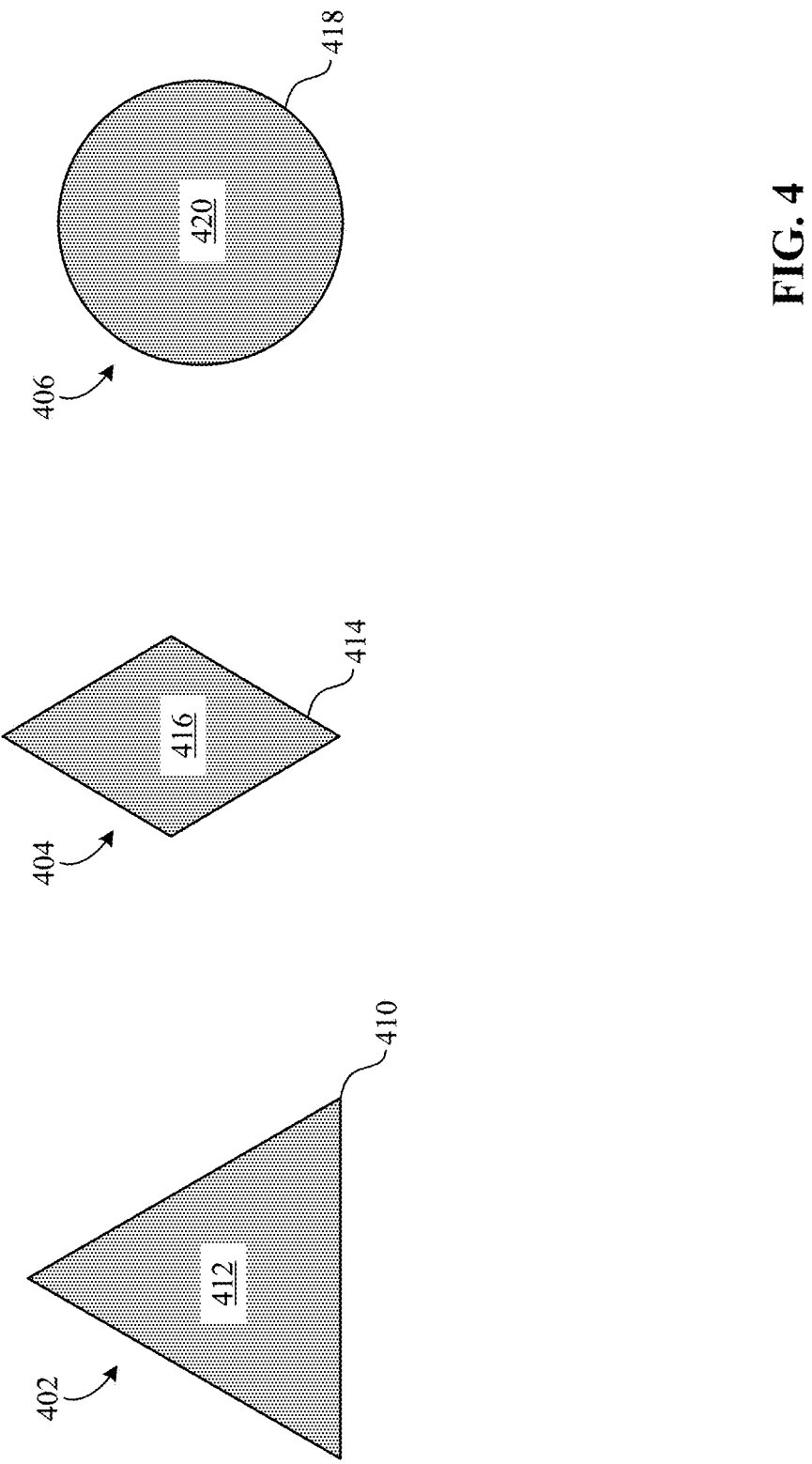

FIG. 4 is a schematic illustration of example positioning features 402, 404, 406 in accordance with the teachings of this disclosure, three of which are shown in this example (i.e., a tenth positioning feature 402, an eleventh positioning feature 404, and a twelfth positioning feature 406). In some examples, one or more of the positioning features 402, 404, 406 of FIG. 4 correspond to and/or are used to implement the positioning feature(s) 102, 104, 106, 108, 109, 202, 302, 304, 306 of FIGS. 1-3. In such examples, the detection system 100 of FIGS. 1 and 2 includes the positioning features 402, 404, 406 of FIG. 4. In particular, each of the positioning features 402, 404, 406 of FIG. 4 has a unique shape or geometry associated therewith that is identifiable by the controller(s) 112, 204 of the detection system 100.

According to the illustrated example of FIG. 4, the tenth positioning feature 402 has a contour 410 forming a shape of the tenth positioning feature 402 such as, for example, a triangle (e.g., a regular or irregular triangle). The tenth positioning feature 402 also has an area 412 defined by the contour 410 of the tenth positioning feature 402. Further, the eleventh positioning feature 404 of FIG. 4 has a contour 414 forming a shape of the eleventh positioning feature 404 such as, for example, a quadrilateral (e.g., a regular or irregular quadrilateral) such as one of a square, a rectangle, a rhombus, a trapezoid, etc. The eleventh positioning feature 404 also has an area 416 defined by the contour 410 of the eleventh positioning feature 404. Further still, the twelfth positioning feature 406 of FIG. 4 has a contour 418 forming a shape of the twelfth positioning feature 406 such as, for example, a curved shape such as one of a circle, an oval, an ellipse, etc. The twelfth positioning feature 406 also has an area 420 defined by the contour 418 of the twelfth positioning feature 406.

Figure 5:
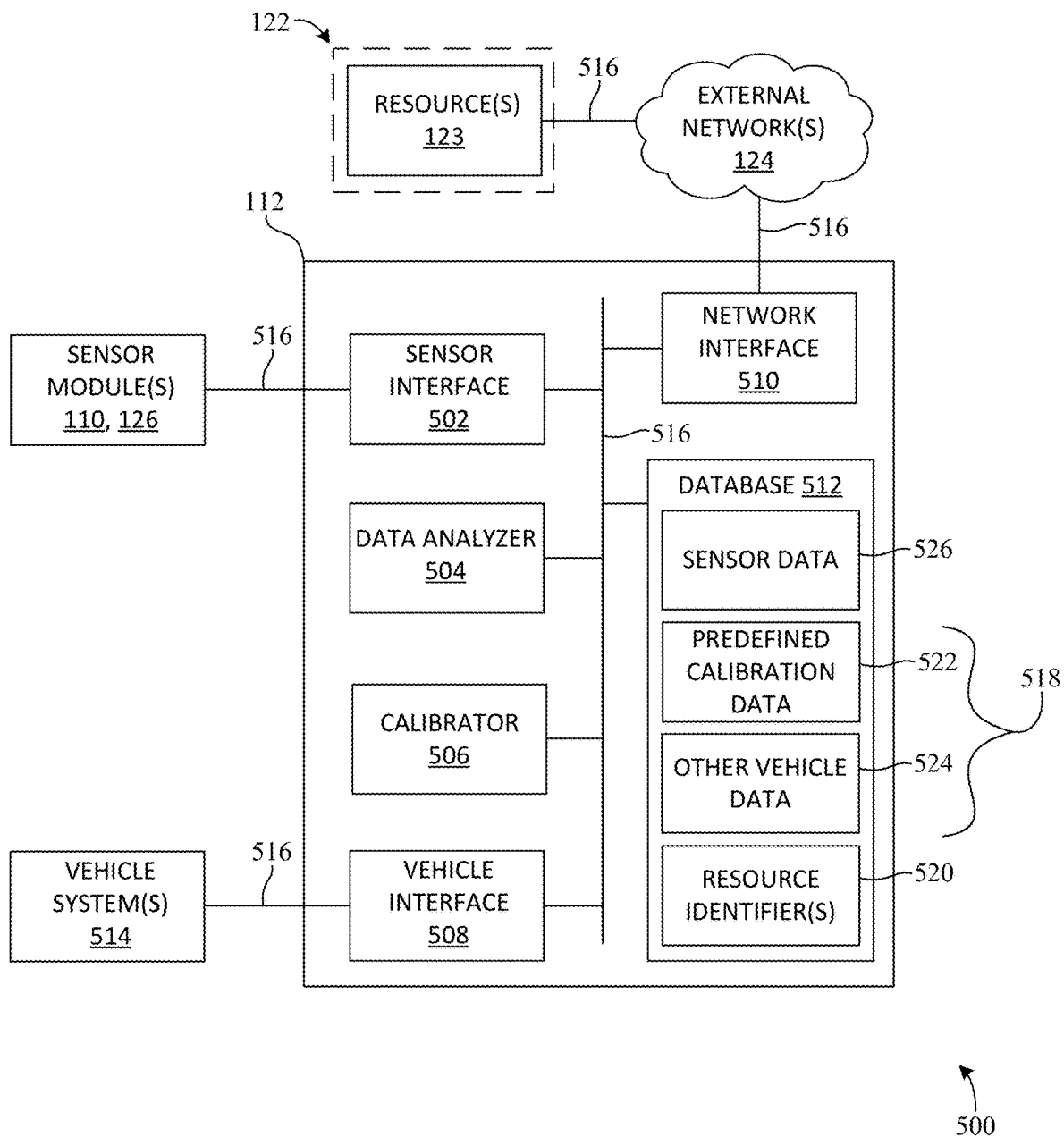
FIG. 5 is a block diagram of an example control system in accordance with the teachings of this disclosure.

FIG. 5 is a block diagram of an example control system 500 in accordance with the teachings of this disclosure. The control system 500 of FIG. 5 can be implemented by any controller of the detection system 100 such as, for example, the first controller 112 of FIGS. 1 and 2. According to the illustrated example of FIG. 5, the control system 500 includes an example sensor interface 502, an example data analyzer 504, an example calibrator 506, an example vehicle interface 508, an example network interface 510, and an example database 512. The control system 500 of FIG. 5 is communicatively coupled to the sensor module(s) 110, 126, the external network(s) 124, and one or more example vehicle systems 514 via communication link(s) 516 such as, for example, a signal or transmission wire, a bus (e.g., a vehicle CAN), radio frequency, etc. In particular, the control system 500 of FIG. 5 is configured to detect, via the sensor module(s) 110, 126, one or more (e.g., all) of the positioning feature(s) 102, 104, 106, 108, 109, 202, 302, 304, 306, 402, 404, 406 of the detection system 100 when the positioning feature(s) 102, 104, 106, 108, 109, 202, 302, 304, 306, 402, 404, 406 is/are visible to the sensor module(s) 110, 126. Further, in some examples, the control system 500 is configured to obtain example data of interest (e.g., sharable data) 518 or at least a portion thereof in response to reading and/or decoding one or more (e.g., all) of the machine-readable code(s) 308, 310, 312 of the positioning feature(s) 102, 104, 106, 108, 109, 202, 302, 304, 306, 402, 404, 406, for example, directly from the machine-readable code(s) 308, 310, 312 and/or from the resource(s) 123 referenced by example resource identifier(s) 520 visually encoded in the machine-readable code(s) 308, 310, 312.

In some examples, the data of interest 518 of FIG. 5 includes predefined calibration data 522 associated with the detected one(s) of the positioning feature(s) 102, 104, 106, 108, 109, 202, 302, 304, 306, 402, 404, 406, which enables the calibrator 506 to calibrate the sensor module(s) 110, 126. In such examples, the predefined calibration data 522 of FIG. 5 includes one or more predefined parameters (e.g., predefined sizes, predefined shapes, relative locations, relative orientations, etc.) of the detected one(s) of the positioning feature(s) 102, 104, 106, 108, 109, 202, 302, 304, 306, 402, 404, 406. For example, for the first positioning feature 102, a related portion of the predefined calibration data 522 indicates to the calibrator 506 one or more (e.g., all) of (a) a first predefined size (e.g., a surface area) of the first positioning feature 102, (b) a first predefined shape (e.g., an isosceles triangle) of the first positioning feature 102, (c) a predefined location of the first positioning feature 102 relative to the first vehicle 101, and/or (d) a first predefined orientation of the first positioning feature 102 relative to the first vehicle 101. Additionally, in some examples, the predefined calibration data 522 also includes predefined criteria, which enables the calibrator 506 to determine whether the sensor module(s) 110, 126 are sufficiently calibrated.

Additionally or alternatively, the data of interest 518 of FIG. 5 includes other vehicle data 524 of one or more other vehicles (e.g., the second vehicle 201) different from a vehicle in which the control system 500 is implemented, which enables the data analyzer 504 to identify the other vehicle(s) and/or verify identification thereof. For example, the other vehicle data 524 indicates to the data analyzer 504 one or more registration numbers (e.g., the registration number of the second vehicle 201), one or more VINs (e.g., the VIN of the second vehicle 201), one or more communication addresses (e.g., the communication address of the second vehicle 201), etc.

The sensor interface 502 of FIG. 5 facilitates communications and/or interactions between the control system 500 and the sensor module(s) 110, 126 of the detection system 100. The sensor interface 502 of FIG. 5 is communicatively coupled, via the link(s) 516, to one or more (e.g., all) of the sensor module(s) 110, 126 of the detection system 100 to receive data therefrom and/or provide data thereto. In some examples, the sensor interface 502 receives example sensor data (e.g., raw data) 526 generated by the sensor module(s) 110, 126, which is processed by the data analyzer 504 and/or the calibrator 506. Such sensor data 526 includes, but is not limited to, image data (e.g., one or more images, video, etc.), point data (e.g., one or more point clouds), radar data, sonar data, etc. and/or any other suitable data indicative of the positioning feature(s) 102, 104, 106, 108, 109, 202, 302, 304, 306, 402, 404, 406 and/or the machine-readable code(s) 308, 310, 312.

The data analyzer 504 of FIG. 5 is configured to detect one or more (e.g., all) of the positioning feature(s) 102, 104, 106, 108, 109, 202, 302, 304, 306, 402, 404, 406 of the detection system 100 based on at least a portion of the sensor data 526 indicative of the positioning feature(s) 102, 104, 106, 108, 109, 202, 302, 304, 306, 402, 404, 406. For example, the data analyzer 504 can detect the first positioning feature 102 based on a portion of the sensor data 526 indicative of the first positioning feature 102. Similarly, in some examples, the data analyzer 504 is configured to detect one or more (e.g., all) of the machine-readable code(s) 308, 310, 312 of detected one(s) the positioning feature(s) 102, 104, 106, 108, 109, 202, 302, 304, 306, 402, 404, 406 based on at least a portion of the sensor data 526 indicative of the machine-readable code(s) 308, 310, 312. For example, data analyzer 504 can detect the first machine-readable code of the first positioning feature 102 based on a portion of the sensor data 526 indicative of the first machine-readable code. Further, in such examples, the data analyzer 504 is also configured to read and/or decode, based on the portion of the sensor data 526 indicative of the machine-readable code(s) 308, 310, 312, the machine-readable code(s) 308, 310, 312, for example, via one or more decoding methods or techniques. As a result of such decoding, the data analyzer 504 obtains some or all of the data of interest 518 from decoded one(s) of the machine-readable code(s) 308, 310, 312. Additionally or alternatively, in some examples, the data analyzer 504 obtains some or all of the resource identifier(s) 520 from the decoded one(s) of the machine-readable code(s) 308, 310, 312. For example, the data analyzer 504 can read and/or decode the first machine-readable code of the first positioning feature 102, thereby obtaining at least some or all of the data of interest 518 and/or one of the resource identifier(s) 520 from the first machine-readable code.

The calibrator 506 of FIG. 5 facilitates one or more calibration processes of the sensor module(s) 110, 126 of the detection system 100. In some examples, the calibrator 506 is configured to use at least some of the predefined calibration data 522 to calibrate the sensor module(s) 110, 126. In such examples, the calibrator 506 is configured to first calculate and/or determine one or more observed parameters of the detected one(s) of the positioning feature(s) 102, 104, 106, 108, 109, 202, 302, 304, 306, 402, 404, 406 based on a related portion of the sensor data 526. For example, when the control system 500 detects the first positioning feature 102, the calibrator 506 calculates and/or determines one or more (e.g., all) of (a) the first observed size of the first positioning feature 102, (b) the first observed shape of the first positioning feature 102, (c) the first observed location of the positioning feature 102 relative to the structure of interest on which the first positioning feature is disposed, and/or (d) the first observed orientation of the first positioning feature 102 relative to the structure of interest. Then, the calibrator 506 compares the observed parameter(s) to particular ones of the predefined parameter(s) provided by the predefined calibration data 522. For example, the calibrator 506 compares (a) the first observed size to the first predefined size, (b) the first observed shape to the first predefined shape, (c) the first observed location relative to the first predefined location, and/or (d) the first observed orientation to the first predefined orientation. In particular, such a comparison indicates to the calibrator 506 one or more differences between the observed parameter(s) and the predefined parameter(s). In this manner, based on the comparison and/or the difference(s), the calibrator 506 can determine whether the sensor module(s) 110, 126 are sufficiently calibrated and, if at least one of the sensor module(s) 110, 126 is not sufficiently calibrated, calculate and/or determine one or more example adjustments for the sensor module(s) 110, 126 associated with calibrating the sensor module(s) 110, 126. The adjustment(s), when carried out by the calibrator 506, change one or more operating parameters of the sensor module(s) 110, 126, thereby calibrating the sensor module(s) 110, 126. Additionally, or alternatively, in some examples, the calibrator 506 enables self-calibration of the sensor module(s) 110, 126. In such examples, the calibrator 506 and/or sensor interface 502 transmit the observed parameter(s) and/or the predefined parameter(s) to the sensor module(s) 110, 126.

The vehicle interface 508 facilitates communications and/or interactions between the control system 500 and the vehicle system(s) 514. The vehicle interface 508 is communicatively coupled, via the link(s) 516, to the vehicle system(s) 514 to receive data therefrom and/or provide data thereto. The vehicle system(s) 514 of FIG. 5 include one or more systems of the vehicle in which the control system 500 is implemented. For example, the vehicle system(s) 514 include a GPS of the first vehicle 101. In such examples, the vehicle interface 508 obtains (e.g., repeatedly and/or continuously) a location of the first vehicle 101 from the GPS of the first vehicle 101. Similarly, in examples where the control system 500 is implemented in the second vehicle 201, the vehicle interface 508 obtains (e.g., repeatedly and/or continuously) a location of the second vehicle 201 from a GPS of the second vehicle 201.

The network interface 510 of FIG. 5 facilitates communications and/or interactions between the control system 500 and one or more systems and/or devices external to the control system 500. In some examples, the network interface 510 is implemented using a communication device associated with dedicated short range communication (DSRC) such as, for example, a transmitter, a receiver, and/or at transceiver. Additionally or alternatively, in some examples, the network interface 510 is implemented using a communication device associated with cellular vehicle-to-everything (C-V2X) communication. In particular, the network interface 510 is communicatively coupled to the external network(s) 124 via the link(s) 516 to receive data from the external network(s) 124 and/or provide data to the external network(s) 124. In some examples, the network interface 510 is configured to communicate with the processing platform 122 via the external network(s) 124 to locate and/or access the resource(s) 123 referenced by the resource identifier(s) 520, thereby obtaining some or all of the data of interest 518 from the resource(s) 123.

The database 512 of FIG. 5 stores data (e.g., at least some or all of the resource identifier(s) 520, the predefined calibration data 522, the other vehicle data 524, the sensor data 526, etc.) and/or provides access to at least a portion of the data therein. In particular, the database 512 is communicatively coupled, via the link(s) 516, to the sensor interface 502, the data analyzer 504, the calibrator 506, the vehicle interface 508, and the network interface 510. For example, the database 512 receives (e.g., repeatedly or continuously) data from the sensor interface 502, the data analyzer 504, the calibrator 506, the vehicle interface 508, and/or the network interface 510. Conversely, the database 512 provides (e.g., repeatedly or continuously) data to the sensor interface 502, the data analyzer 504, the calibrator 506, the vehicle interface 508, and/or the network interface 510.

At least some or all of the predefined calibration data 522, the other vehicle data 524, and/or, more generally, the data of interest 518 of FIG. 5 is visually encoded in one or more (e.g., all) of the machine-readable code(s) 308, 310, 312 of the detection system 100, for example, via one or more visual encoding methods or techniques. Additionally or alternatively, at least some or all of the predefined calibration data 522, the other vehicle data 524, and/or, more generally, the data of interest 518 of FIG. 5 is stored in one or more of the resource(s) 123. In such examples, at least some or all of the resource identifier(s) 520 are visually encoded in one or more (e.g., all) of the machine-readable code(s) 308, 310, 312 of the detection system 100.

Although the example control system 500 is illustrated in FIG. 5, one or more of the elements, processes, and/or devices depicted in FIG. 5 may be combined, divided, re-arranged, omitted, eliminated, and/or implemented in any other way. Further, the example control system 500 of FIG. 5 may include one or more elements, processes, and/or devices in addition or alternatively to those illustrated in FIG. 5, and/or may include more than one of any or all of the illustrated elements, processes, and devices.

Additionally, one or more of the example sensor interface 502, the example data analyzer 504, the example calibrator 506, the example vehicle interface 508, the example network interface 510, the example database 512, and/or, more generally, the example control system 500 of FIG. 5 may be implemented by hardware, software, firmware and/or any combination of thereof. For example, any of the example sensor interface 502, the example data analyzer 504, the example calibrator 506, the example vehicle interface 508, the example network interface 510, the example database 512, and/or, more generally, the example control system 500 could be implemented by one or more circuits (e.g., an analog or digital circuit, a logic circuit, a programmable processor, etc.). Further, in some examples, at least one of the sensor interface 502, the data analyzer 504, the calibrator 506, the vehicle interface 508, the network interface 510, the database 512, and/or the control system 500 include(s) a tangible machine-readable storage device or storage disk (e.g., a memory storing the software and/or firmware).

Figure 6A:
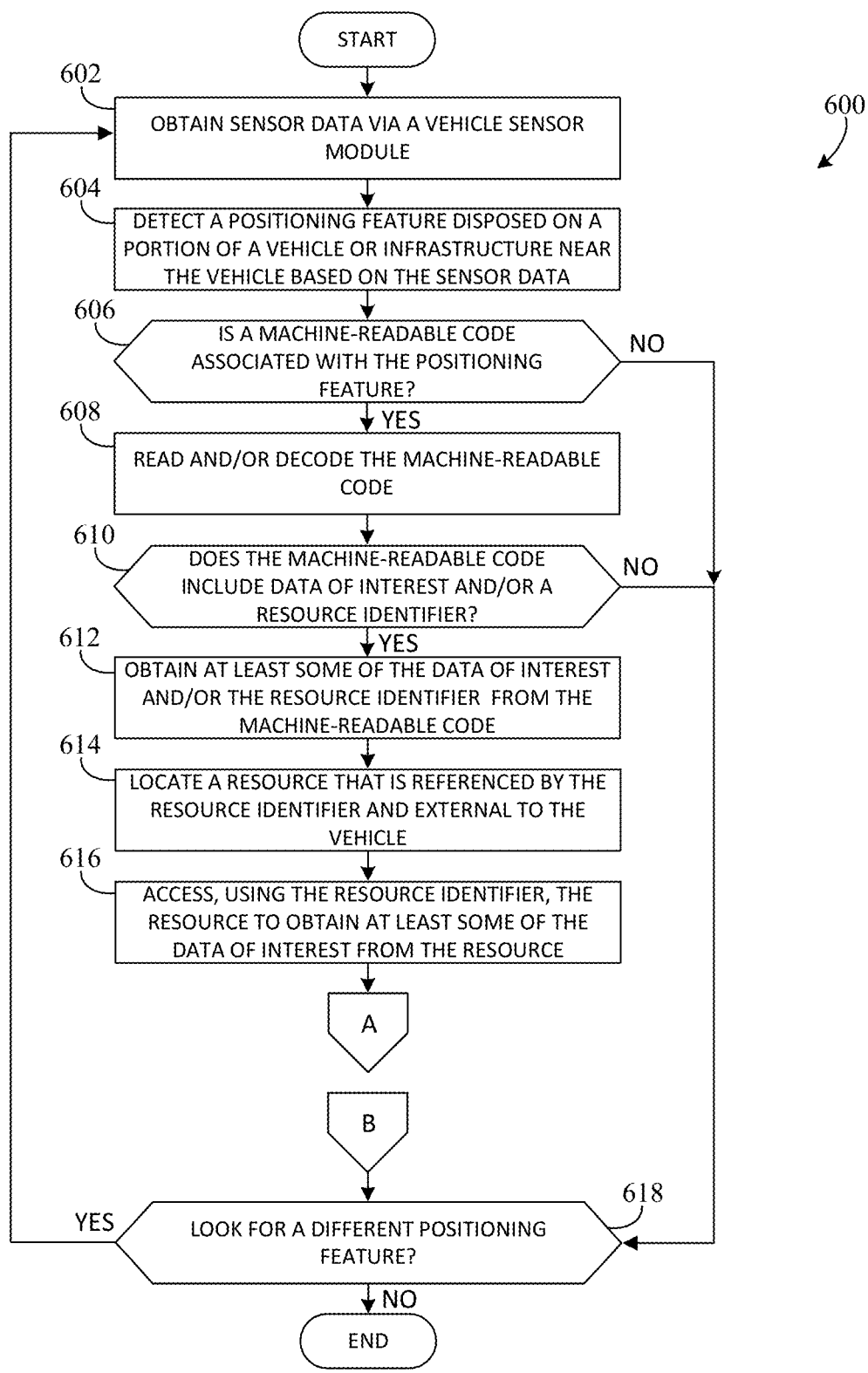
FIGS. 6A, 6B, and 7 are flowcharts representative of example methods that can be executed to implement the example control system of FIG. 5.
Figure 6B:
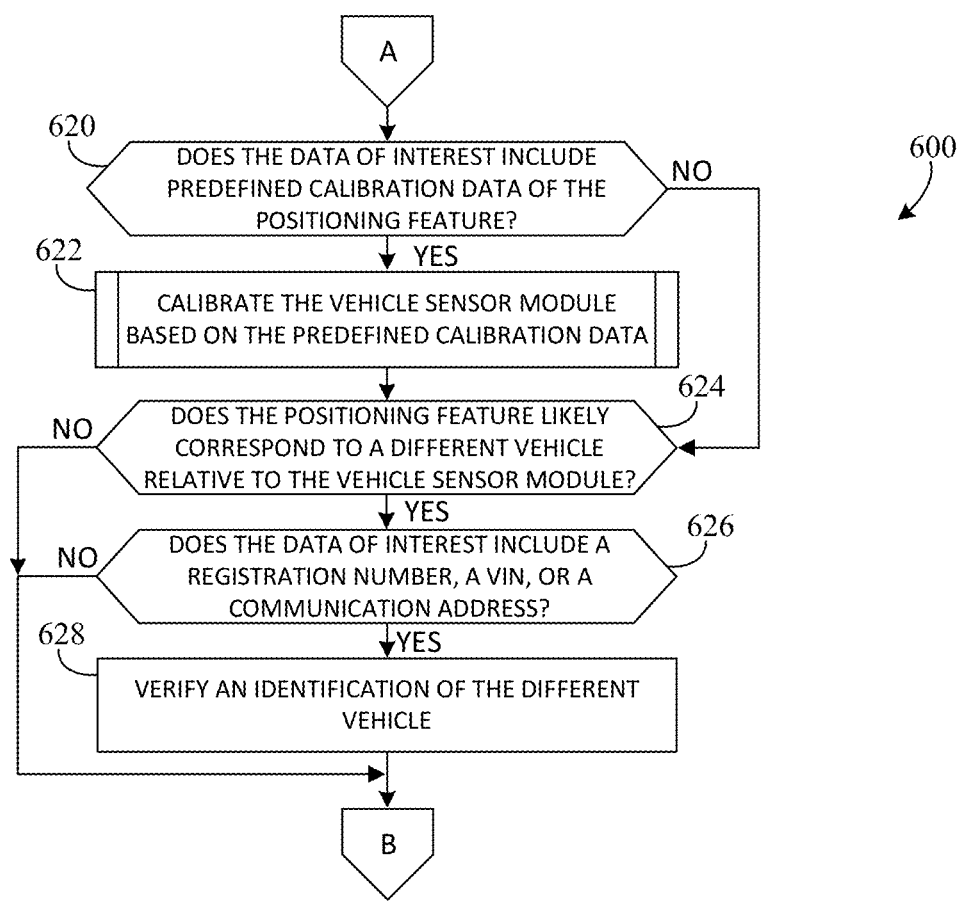
Figure 7:
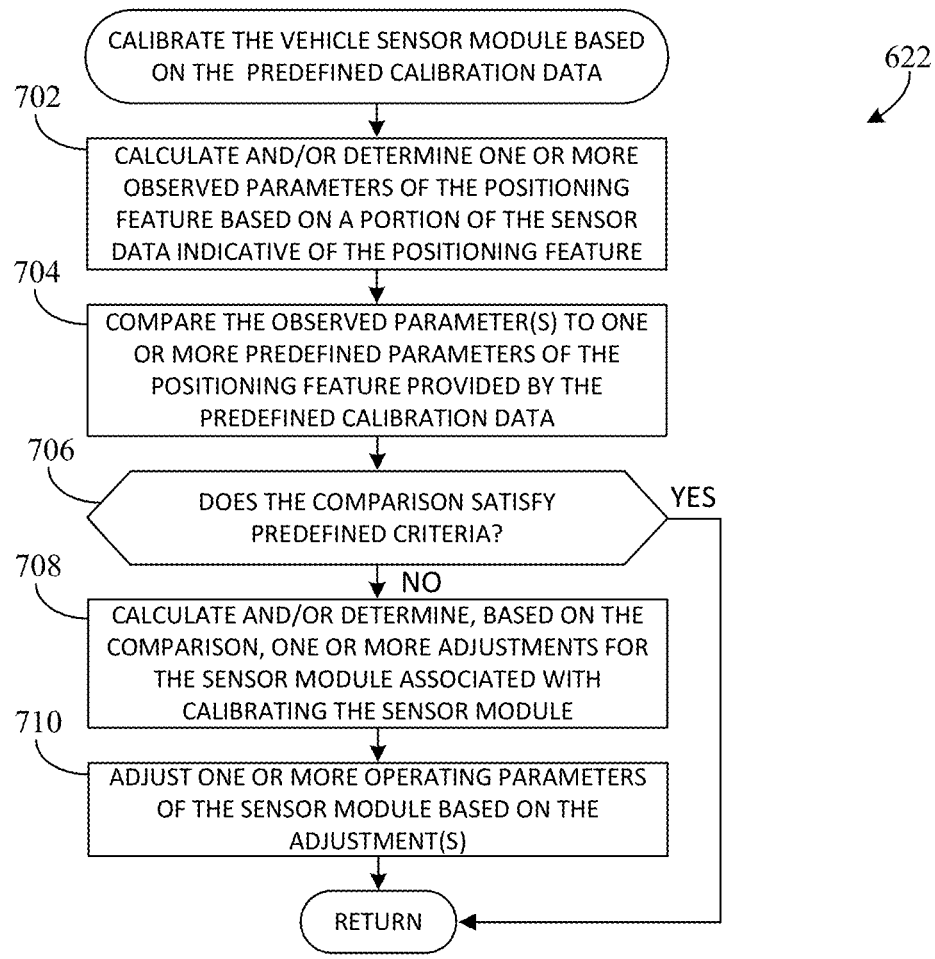

Flowcharts representative of example hardware logic or machine-readable instructions for implementing the example control system 500 of FIG. 5 are shown in FIGS. 6A, 6B, and 7. The machine-readable instructions may be a program or portion of a program for execution by a processor (e.g., the CPU 802 of FIG. 8), which is discussed in greater detail below in connection with FIG. 8. The program may be embodied in software stored on a tangible machine-readable storage medium such as a CD-ROM, a floppy disk, a hard drive, or a memory associated with the processor. Alternatively, the entire program and/or parts thereof could be executed by a different device and/or embodied in firmware or dedicated hardware.

The example processes of FIGS. 6A, 6B, and 7 may be implemented using executable or coded instructions (e.g. computer or machine-readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and to exclude propagating signals and all transmission media. Additionally or alternatively, the example methods of FIGS. 6A, 6B, and 7 may be implemented using coded instructions stored on a non-transitory machine-readable medium in which information is stored for any duration, which includes any type of computer or machine-readable storage device or disk and excludes propagating signals and transmission media.

As used herein, the terms "Including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

FIGS. 6A and 6B are flowcharts representative of an example method 600 that can be executed to implement the example calibration system of FIG. 5. The example method 600 of FIGS. 6A and 6B can be implemented in any of the detection system 100 of FIGS. 1 and 2, the first vehicle 101 of FIGS. 1 and 2, the second vehicle 201 of FIG. 2, the first controller 112 of FIGS. 1, 2, and 5, and/or the second controller 204 of FIG. 2. In particular, the example method 600 of FIG. 6 is effective in obtaining data of interest that is associated with a detected positioning feature and/or a detected vehicle.

The example method 600 of FIG. 6A begins by obtaining sensor data via a vehicle sensor module (block 602). In some examples, the control system 500 of FIG. 5 obtains (e.g., via the sensor interface 502) at least some or all of the sensor data 526 via the sensor module(s) 110, 126 of the detection system 100. For example, the control system 500 obtains a first portion of the sensor data 526 indicative of the first positioning feature 102, the fifth positioning feature 109, or the sixth positioning feature 202 via the first sensor module 126.

The example method 600 of FIG. 6A also includes detecting a positioning feature disposed on a portion of a vehicle or infrastructure near the vehicle based on the sensor data (block 604). In some examples, the control system 500 of FIG. 5 detects (e.g., via the data analyzer 504) one of the positioning feature(s) 102, 104, 106, 108, 109, 202, 302, 304, 306, 402, 404, 406 of the detection system 100 based on the sensor data 526 obtained in connection with block 602, which is sometimes referred to as a detected one of the positioning feature(s) 102, 104, 106, 108, 109, 202, 302, 304, 306, 402, 404, 406. As previously mentioned, the positioning feature(s) 102, 104, 106, 108, 109, 202, 302, 304, 306, 402, 404, 406 of the detection system 100 are disposable on, for example, one or more (e.g., all) of (a) the first vehicle 101 of FIGS. 1 and 2, (b) the second vehicle 201 of FIG. 2, (c) one or more other vehicles different from the first and second vehicles 101, 201, (d) the driving surface 121, (e) and/or different infrastructure. For example, based on the first portion of the sensor data 526, the control system 500 detects the first positioning feature 102 on the first vehicle 101, the fifth positioning feature 109 on the driving surface 121, or the sixth positioning feature 202 on the second vehicle 201 when that positioning feature 102, 109, 202 is visible to the first sensor module 126.

The example method 600 of FIG. 6A also includes determining whether a machine-readable code is associated with the positioning feature (block 606). In some examples, the control system 500 of FIG. 5 determines (e.g., via the data analyzer 504) whether one of the machine-readable code(s) 308, 310, 312 of the detection system 100 is associated with the detected one of the positioning feature(s) 102, 104, 106, 108, 109, 202, 302, 304, 306, 402, 404, 406. For example, the control system 500 determines that (a) the first machine-readable code is associated with the first position feature 102, (b) the fifth machine-readable code is associated with the fifth positioning feature 109, or (c) the sixth machine-readable code is associated with the sixth positioning feature 202. If the control system 500 provides a positive determination (block 606: YES), control of the example method 600 of FIG. 6A proceeds to block 608. On the other hand, in some examples, if the control system 500 provides a negative determination (block 606: NO), control of the example method 600 of FIG. 6A proceeds to block 618.

The example method 600 of FIG. 6A also includes reading and/or decoding the machine-readable code (block 608). In some examples, the control system 500 of FIG. 5 reads and/or decodes (e.g., via the data analyzer 504) the one of the machine-readable code(s) 308, 310, 312 in connection with block 606, which is sometimes referred to as a decoded one of the machine-readable code(s) 308, 310, 312. For example, the control system 500 reads and/or decodes (a) the first machine-readable code of the first positioning feature 102, (b) the fifth machine-readable code of the fifth positioning feature 109, or (c) the sixth machine-readable code of the sixth positioning feature 202. Further, in such examples, the control system 500 identifies at least some or all of the data of interest 518 and/or the resource identifier(s) 520.

The example method 600 of FIG. 6A also includes determining whether the machine-readable code includes data of interest and/or a resource identifier (block 610). In some examples, the control system 500 of FIG. 5 determines (e.g., via the data analyzer 504) whether the decoded one of the machine-readable code(s) 308, 310, 312 in connection with block 608 includes at least some of the data of interest 518 and/or a first one of the resource identifier(s) 520. If the control system 500 provides a positive determination (block 610: YES), control of the example method 600 of FIG. 6A proceeds to block 612. On the other hand, in some examples, if the control system 500 provides a negative determination (block 610: NO), control of the example method 600 of FIG. 6A proceeds to block 618.

The example method 600 of FIG. 6A also includes obtaining at least some of the data of interest and/or the resource identifier from the machine-readable code (block 612). In some examples, the control system 500 of FIG. 5 obtains (e.g., via the data analyzer 504) at least some of the data of interest 518 and/or the first one of the resource identifier(s) 520 from the decoded one of the machine-readable code(s) 308, 310, 312. For example, the control system 500 obtains, from the decoded one of the machine-readable code(s) 308, 310, 312, at least a first portion of the predefined calibration data 522 of or specific to the detected one of the positioning feature(s) 102, 104, 106, 108, 109, 202, 302, 304, 306, 402, 404, 406. In another example, the control system 500 obtains, from the decoded one of the machine-readable code(s) 308, 310, 312, at least a first portion of the other vehicle data 524 (e.g., the registration number of the second vehicle 201, the VIN of the second vehicle 201, and/or the communication address of the second vehicle 201) of or specific to a different vehicle on which the detected one of the positioning feature(s) 102, 104, 106, 108, 109, 202, 302, 304, 306, 402, 404, 406 is disposed.

The example method 600 of FIG. 6A also includes locating a resource that is referenced by the resource identifier and external to the vehicle (block 614). In some examples, the control system 500 of FIG. 5 locates (e.g., via the data analyzer 504 and/or the network interface 510) a first one of the resource(s) 123 referenced by the first one of the resource identifier(s) 520 and/or the processing platform 122 in which the resource 123 is stored. As previously mentioned, the resource(s) 123 is/are stored in the processing platform 122 external to the vehicle(s) 101, 201 of the detection system 100 and accessible to the control system 500.

The example method 600 of FIG. 6A also includes accessing, using the resource identifier, the resource to obtain at least some of the data of interest from the resource (block 616). In some examples, the control system 500 of FIG. 5 accesses (e.g., via the network interface 510), using the first one of the resource identifier(s) 520, the first one of the resource(s) 123 to obtain at least some or all of the data of interest 518 from the first one of the resource(s) 123. In such examples, the control system 500 communicates with the external processing platform 122 via the external network(s) 124.

The example method 600 of FIG. 6A also includes determining whether to look for a different positioning feature (block 618), for example, after the example operations of at least blocks 620, 622, 624 occur. In some examples, the control system 500 of FIG. 5 determines (e.g., via the data analyzer 504) whether to look for a different one of the positioning feature(s) 102, 104, 106, 108, 109, 202, 302, 304, 306, 402, 404, 406 of the detection system 100. If the control system 500 provides a positive determination (block 618: YES), control of the example method 600 of FIG. 6A returns to block 602. On the other hand, in some examples, if the control system 500 provides a negative determination (block 618: NO), the example process ends.

Turning in detail to FIG. 6B, the example method 600 also includes determining whether the data of interest includes predefined calibration data of the positioning feature (block 620). In some examples, the control system 500 of FIG. 5 determines (e.g., via the data analyzer 504) whether the data of interest 518 obtained in connection with block 612 and/or block 616 includes at least some of the predefined calibration data 522. If the control system 500 provides a positive determination (block 620: YES), control of the example method 600 of FIG. 6B proceeds to block 622. On the other hand, in some examples, if the control system 500 provides a negative determination (block 620: NO), control of the example method 600 of FIG. 6B proceeds to block 624.

The example method 600 of FIG. 6B also includes calibrating the vehicle sensor module based on the predefined calibration data (block 622). In some examples, the control system 500 of FIG. 5 calibrates (e.g., via the calibrator 506) the sensor module(s) 110, 126 (e.g., used to obtain the sensor data 526 in connection with block 602) based on at least some of the predefined calibration data 522, as discussed further below in connection with FIG. 7. In such examples, the control system 500 calibrates the first sensor module 126 based on the first portion of the sensor data 526 by particularly adjusting one or more operating parameters of the first sensor module 126.

The example method 600 of FIG. 6B also includes determining whether the positioning feature likely corresponds to a different vehicle relative to the sensor module (block 624). In some examples, the control system 500 of FIG. 5 determines (e.g., via the data analyzer 504) whether the detected one of the positioning feature(s) 102, 104, 106, 108, 109, 202, 302, 304, 306, 402, 404, 406 likely corresponds to or is disposed on a different vehicle (e.g., the second vehicle 201) relative to the sensor module(s) 110, 126. If the control system 500 provides a positive determination (e.g., the detected one of the positioning feature(s) 102, 104, 106, 108, 109, 202, 302, 304, 306, 402, 404, 406 corresponds to or is disposed on the second vehicle 201 and the first sensor module 126 corresponds to or is disposed on the first vehicle 101) (block 624: YES), control of the example method 600 of FIG. 6B proceeds to block 626. On the other hand, in some examples, if the control system 500 provides a negative determination (e.g., the detected one of the positioning feature(s) 102, 104, 106, 108, 109, 202, 302, 304, 306, 402, 404, 406 and the first sensor module 126 correspond to or are disposed on the first vehicle 101) (block 624: NO), control of the example method proceeds to block 618 of FIG. 6A.

The example method 600 of FIG. 6B also includes determining whether the data of interest includes a registration number, a VIN, or a communication address (block 626). In some examples, the control system 500 of FIG. 5 determines (e.g., via the data analyzer 504) whether the data of interest 518 obtained in connection with block 612 and/or block 616 includes at least one of a registration number, a VIN, or a communication address. If the control system 500 provides a positive determination (e.g., the data of interest 518 includes at least one of the registration number of the second vehicle 201, the VIN of the second vehicle 201, or the communication address of the second vehicle 201) (block 626: YES), control of the example method 600 of FIG. 6B proceeds to block 628. On the other hand, in some examples, if the control system 500 provides a negative determination (block 626: NO), control of the example method 600 of FIG. 6B proceeds to block 618 of FIG. 6A.

The example method 600 of FIG. 6B also includes verifying an identification of the different vehicle (block 628). In some examples, the control system 500 of FIG. 5 verifies (e.g., via the data analyzer 504) an identification of the second vehicle 201, for example, based on the registration of the second vehicle 201, the VIN of the second vehicle 201, or the communication address of the second vehicle 201.

Although the example method 600 is described in connection with the flowchart of FIG. 6, other methods of implementing the control system 500 may alternatively be used. For example, the order of execution of the blocks 602, 604, 606, 608, 610, 612, 614, 616, 618, 620, 622, 624, 626, 628 may be changed, and/or some of the blocks 602, 604, 606, 608, 610, 612, 614, 616, 618, 620, 622, 624, 626, 628 described may be changed, eliminated, or combined. In some examples, during the execution of the example method 600 of FIGS. 6A and 6B, the control system 500 is configured to detect multiple ones (e.g., all) of the positioning features 102, 104, 106, 108, 109, 202, 302, 304, 306, 402, 404, 406, for example, simultaneously or successively.

FIG. 7 is a flowchart representative of another example method 622 that can be executed to implement the example control system 500 of FIG. 5. The example method 622 of FIG. 7 can be implemented in any of the detection system 100 of FIGS. 1 and 2, the first vehicle 101 of FIGS. 1 and 2, and/or the second vehicle 201 of FIG. 2. Example operations of blocks 702, 704, 706, 708, 710 may be used to implement block 622 of FIG. 6. In particular, the example method 622 of FIG. 7 is effective in calibrating one or more vehicle sensor modules based on predefined calibration data of a detectable positioning feature.

The example method 622 of FIG. 7 begins by calculating and/or determining one or more observed parameters of the positioning feature based on a portion of the sensor data indicative of the positioning feature (block 702). In some examples, the control system 500 of FIG. 5 calculates and/or determines (e.g., via the calibrator 506) one or more observed parameters of the detected one of the positioning feature(s) 102, 104, 106, 108, 109, 202, 302, 304, 306, 402, 404, 406 based on at least a portion of the sensor data 526. As previously mentioned, the first portion of the sensor data 526 is indicative of the detected one of the positioning feature(s) 102, 104, 106, 108, 109, 202, 302, 304, 306, 402, 404, 406 as well as the observed parameter(s) thereof. For example, with respect to the first positioning feature 102, the control system 500 determines, based on the first portion of the sensor data 526, one or more (e.g., all) of (a) the first observed size of the first positioning feature 102, (b) the first observed shape of the first positioning feature 102, (c) the first observed location of the positioning feature 102 relative to structure of interest on which the first positioning feature is disposed, and/or (d) the first observed orientation of the first positioning feature 102 relative to the structure of interest.

The example method 622 of FIG. 7 also includes comparing the observed parameter(s) to one or more predefined parameters of the positioning feature provided by the predefined calibration data (block 704). In some examples, the control system 500 of FIG. 5 compares (e.g., via the calibrator 506) the observed parameter(s) determined in connection with block 702 to one or more predefined parameters of the detected one of the positioning feature(s) 102, 104, 106, 108, 109, 202, 302, 304, 306, 402, 404, 406 provided by the predefined calibration data 522. For example, with respect to the first positioning feature 102, the control system 500 compares (a) the first observed size to the first predefined size, (b) the first observed shape to the first predefined shape, (c) the first observed location relative to the first predefined location, and/or (d) the first observed orientation to the first predefined orientation.

The example method 622 of FIG. 7 also includes determining whether the comparison satisfies predefined criteria (block 706). In some examples, the control system 500 of FIG. 5 determines (e.g., via the data analyzer 504) whether the comparison performed in connection with block 704 satisfies the predefined criteria provided by the predefined calibration data 522. If the control system 500 provides a positive determination (e.g., all of the sensor module(s) 110, 126 are sufficiently calibrated) (block 706: YES), control of the example method 622 of FIG. 7 returns to a calling function such as the example method 600 of FIG. 6B. On the other hand, in some examples, if the control system 500 provides a negative determination (e.g., at least one of the sensor module(s) 110, 126 is not sufficiently calibrated) (block 706: NO), control of the example method 622 of FIG. 7 proceeds to block 708.

The example method 622 of FIG. 7 also includes calculating and/or determining, based on the comparison, one or more adjustments for the sensor module associated with calibrating the sensor module (block 708). In some examples, the control system 500 of FIG. 5 calculates and/or determines (e.g., via the calibrator 506), based on the comparison performed in connection with block 704, one or more adjustments for the sensor module(s) 110, 126 (e.g., used to obtain the sensor data 526 in connection with block 602) associated with the calibrating the sensor module(s) 110, 126. For example, the control system 500 calculates and/or determines, based on the comparison, one or more first adjustments for the first sensor module 126 associated calibrating the first sensor module 126.

The example method 622 of FIG. 7 also includes adjusting one or more operating parameters of the sensor module based on the adjustment(s) (block 710). In some examples, the control system 500 of FIG. 5 adjusts (e.g., via the calibrator 506) one or more operating parameters of the sensor module(s) 110, 126 (e.g., used to obtain the sensor data 526 in connection with block 602) based on the adjustment(s) determined in connection with block 708. For example, the control system 500 adjusts one or more operating parameters of the first sensor module 126 based on the first adjustment(s).

Although the example method 622 is described in connection with the flowchart of FIG. 7, other methods of implementing the example control system 500 may alternatively be used. For example, the order of execution of the blocks 702, 704, 706, 708, 710 may be changed, and/or some of the blocks 702, 704, 706, 708, 710 described may be changed, eliminated, or combined.

Figure 8:
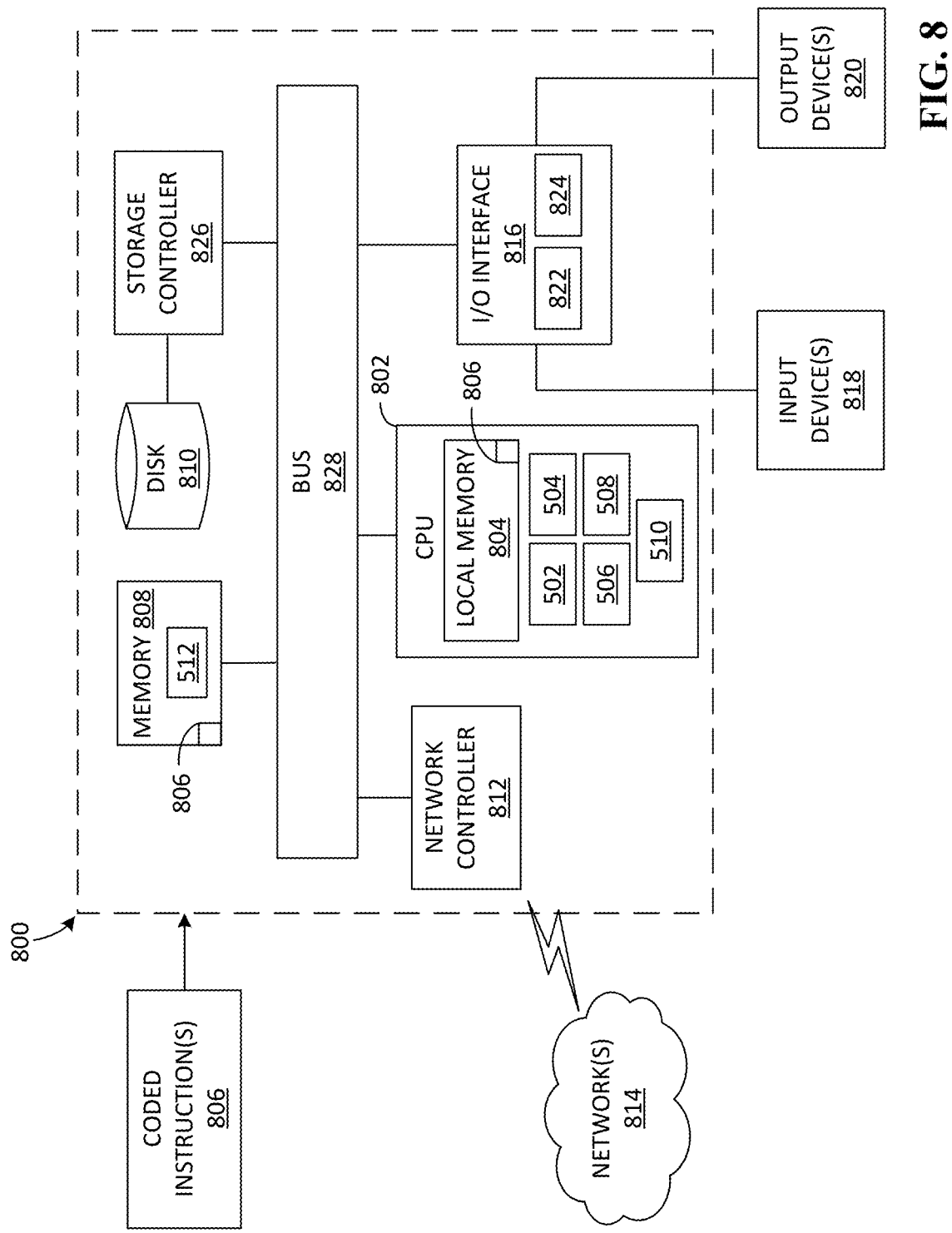
FIG. 8 is a block diagram of an example processor platform structured to execute instructions to carry out the methods of FIGS. 6A, 6B, and 7 and/or, more generally, to implement the control system of FIG. 5.

FIG. 8 is a block diagram of an example processor platform 800 structured to execute instructions to carry out the methods of FIGS. 6A, 6B, and 7 and/or, more generally, to implement the control system 500 of FIG. 5. For example, the processor platform 800 can be a personal computer, a server, a mobile device (e.g., a cell phone, a smart phone, a tablet, etc.) or any other type of computing device. According to the illustrated example of FIG. 8, the processor platform 800 includes a central processing unit (CPU) 802 (sometimes referred to as a processor), which is hardware (e.g., one or more integrated circuits, logic circuits, microprocessors, etc.). The CPU 802 of FIG. 800 includes a local memory 804 such as, for example, a cache. According to the illustrated example of FIG. 800, the CPU 802 implements the example sensor interface 502, the example data analyzer 504, the example calibrator 506, the example vehicle interface 508, and the example network interface 510.

Coded instruction(s) 806 to implement the method of FIGS. 6A, 6B, and 7 may be stored in a main memory 808 of the processing platform 800. The memory 808 may include a volatile memory (e.g., random access memory device(s) such as Dynamic Random Access Memory (DRAM)) and a non-volatile memory (e.g., flash memory). Such processes and/or instructions may also be stored on a storage medium disk 810 associated with the processor platform 800, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing platform 800 communicates, such as a server or computer. According to the illustrated example of FIG. 8, the main memory 808 implements the example database 512.

Further, the claimed advancements may be provided as a utility application, background daemon, or component of an operating system, or combination thereof, executing in conjunction with the CPU 802 and an operating system such as, for example, Microsoft Windows 7, UNIX, Solaris, LINUX, Apple MAC-OS or any other system(s) known to those skilled in the art.

The hardware elements in order to achieve the processing platform 800 may be realized by various circuitry elements, known to those skilled in the art. For example, the CPU 802 may be a Xenon or Core processor from Intel of America or an Opteron processor from AMD of America, or may be other processor types that would be recognized by one of ordinary skill in the art. Alternatively, the CPU 802 may be implemented on an FPGA, ASIC, PLD or using discrete logic circuits, as one of ordinary skill in the art would recognize. Further, the CPU 802 may be implemented as multiple processors cooperatively working in parallel to perform the instructions of the inventive processes described above.

In some examples, the processor platform 800 of FIG. 800 also includes a network controller 812 such as, for example, an Intel Ethernet PRO network interface card from Intel Corporation of America for interfacing with one or more networks 814. As can be appreciated, the network(s) 814 can be one or more public networks (e.g., the Internet), private networks (e.g., a local area network (LAN), a wide area network (WAN), etc.) and/or sub-networks (e.g., a public switched telephone network (PSTN), an integrated services digital network (ISDN), etc.). The network(s) 814 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing platform 800 of FIG. 800 includes a general purpose I/O interface circuit 816 that interfaces and/or otherwise communicates with one or more input devices 818 and/or one or more output devices 820. The I/O interface circuit 816 of FIG. 800 may be implemented as an Ethernet interface, a universal serial bus (USB), a PCI express interface, and/or any other type of standard interface.

The input devices 818 are connected to the I/O interface 816 and may include, for example, a keyboard, a mouse, a touchscreen, a button, a microphone, a voice recognition system, a camera, and/or any other suitable device(s) for enabling a user to input data and/or commands to the CPU 802. As such, in some examples, the I/O interface circuit 816 typically includes a display controller 822 such as, for example, a NVIDIA GeForce GTX or Quadro graphics adaptor from NVIDIA Corporation of America for interfacing with a display (e.g., a Hewlett Packard HPL2445w LCD monitor).

The output device(s) 820 are also connected to the I/O interface circuit 816 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit includes a sound controller 824 such as, for example, Sound Blaster X-Fi Titanium from Creative, to interface with a speaker and/or a microphone.

The processor platform 800 of FIG. 800 also includes a general purpose storage controller 826 that connects the storage medium disk 810 with a communication bus 828. The storage controller 826 may also control access to the memory 808. The communication bus 828 of FIG. 800 may be an ISA, EISA, VESA, PCI, etc. for interconnecting all of the components of the processor platform 800. For example, the CPU 802 communicates with the main memory 808 via the bus 828.

It will be appreciated that the systems, apparatus, and methods disclosed in the foregoing description provide numerous advantages. Examples disclosed herein provide an example detection system including one or more positioning features that facilitate providing data of interest to a vehicle controller in response to the vehicle controller reading and/or decoding a machine-readable code of the positioning feature(s). Additionally, some disclosed examples enable the vehicle controller to calibrate, via the data of interest, one or more vehicle sensor modules without assistance from a person.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A detection system for one or more vehicles, comprising:
    a vehicle sensor module;
    a positioning feature disposed on a vehicle exterior or infrastructure, the positioning feature including a machine-readable code associated with predefined calibration data of the positioning feature; and
    control circuitry configured to
        detect, via the vehicle sensor module, the positioning feature when the positioning feature is visible to the vehicle sensor module, obtain the predefined calibration data in response to reading the machine-readable code,
calibrate the vehicle sensor module based on the predefined calibration data,
compare an observed parameter of the positioning feature to a predefined parameter of the positioning feature provided by the predefined calibration data,
determine, based on the comparison, an adjustment for the vehicle sensor module associated with calibrating the sensor module, and
adjust an operating parameter of the vehicle sensor module based on the adjustment.

2. The detection system of claim 1, wherein each of the observed and predefined parameters includes a size of the positioning feature, a shape of the positioning feature, a location of the positioning feature, or an orientation of the positioning feature.

3. The detection system of claim 1, wherein the machine-readable code includes a barcode.

4. The detection system of claim 1, wherein:
the predefined calibration data is visually encoded in the machine-readable code, and
the control circuitry is configured to decode, via the vehicle sensor module, the machine-readable code to obtain the predefined calibration data from the machine-readable code.

5. The detection system of claim 1, wherein:
the vehicle sensor module and the control circuitry are operatively coupled to a first vehicle, and
the positioning feature is disposed on a second vehicle different from the first vehicle.

6. The detection system of claim 5, further including a resource identifier visually encoded in the machine-readable code, the resource identifier referencing a resource that is external to the first vehicle and stores the predefined calibration data, wherein control circuitry is configured to access, using the resource identifier, the resource to obtain the predefined calibration data from the resource.

7. The detection system of claim 6, wherein the control circuitry is a first vehicle controller, further including a second vehicle controller operatively coupled to the second vehicle, the vehicle second controller configured to update the resource such that the predefined calibration data includes data associated with operation of the second vehicle.

8. The detection system of claim 7, wherein the data associated with operation of the second vehicle includes a location of the second vehicle.

9. The detection system of claim 1, wherein the positioning feature includes a tag, a sticker, or paint.

10. The detection system of claim 9, wherein the paint includes infrared paint.

11. The detection system of claim 1, wherein the positioning feature is not visible to a person.

12. The detection system of claim 11, wherein the positioning feature is embedded into paint of a vehicle body.

13. The detection system of claim 11, wherein the positioning feature is configured to emit light having a wavelength between about 700 nanometers and about 1 millimeter.

14. The detection system of claim 1, wherein:
the vehicle sensor module includes a light detection and ranging (LiDAR) sensor, and
the control circuitry is configured to detect the positioning feature in accordance with a method associated with LiDAR.

15. The detection system of claim 1, wherein the vehicle sensor module includes a camera.

16. A vehicle, comprising:
a sensor module; and
a controller configured to detect, via the sensor module, a positioning feature disposed on the vehicle, a different vehicle, or infrastructure when the positioning feature is visible to the sensor module, the positioning feature including a machine-readable code associated with predefined calibration data of the positioning feature, the controller configured to obtain the predefined calibration data in response to reading the machine-readable code and calibrate the sensor module based on the predefined calibration data, wherein the controller is further configured to compare an observed parameter of the positioning feature to a predefined parameter of the positioning feature provided by the predefined calibration data, determine, based on the comparison, an adjustment for the sensor module associated with calibrating the sensor module, and adjust an operating parameter of the sensor module based on the adjustment.

17. The vehicle of claim 16, wherein:
the predefined calibration data is visually encoded in the machine-readable code, and
the controller is configured to decode, via the sensor module, the machine-readable code to obtain the predefined calibration data from the machine-readable code.

18. A tangible machine-readable storage medium comprising instructions that, when executed, cause a processor to at least:
detect, via a sensor module, a positioning feature disposed on a vehicle exterior or infrastructure, the positioning feature including a machine-readable code associated with predefined calibration data of the positioning feature;
obtain the predefined calibration data in response to reading the machine-readable code;
calibrate the sensor module based on the predefined calibration data compare an observed parameter of the positioning feature to a predefined parameter of the positioning feature provided by the predefined calibration data;
determine, based on the comparison, an adjustment for the sensor module associated with calibrating the sensor module; and
adjust an operating parameter of the sensor module based on the adjustment.

* * * * *